United States Patent
Capers et al.

(10) Patent No.: US 6,418,205 B2
(45) Date of Patent: *Jul. 9, 2002

(54) CALL AND CIRCUIT STATE MACHINE FOR A TRANSACTION CONTROL LAYER OF A COMMUNICATIONS SIGNALING GATEWAY

(75) Inventors: James A. Capers, Colorado Springs, CO (US); John Macedo, Clearwater, FL (US); David Phelps; Shannan E. Trousdale, both of Colorado Springs, CO (US)

(73) Assignee: MCI Communications Corporation, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,885

(22) Filed: May 7, 1998

(51) Int. Cl.[7] .............................................. H04M 15/00
(52) U.S. Cl. ................. 379/112.01; 379/229; 379/230; 370/401; 370/466; 370/467
(58) Field of Search ................ 379/33–35, 111–115.02, 379/229–230; 370/464–467

(56) References Cited

U.S. PATENT DOCUMENTS

| | | | |
|---|---|---|---|
| 4,797,910 A | 1/1989 | Daudelin | 379/67 |
| 4,845,739 A | 7/1989 | Katz | 379/92 |
| 4,930,150 A | 5/1990 | Katz | 379/93 |
| 5,048,075 A | 9/1991 | Katz | 379/92 |
| 5,128,984 A | 7/1992 | Katz | 379/92 |
| 5,133,004 A | 7/1992 | Heileman, Jr. et al. | |
| 5,165,095 A | 11/1992 | Borcherding | |
| 5,185,781 A | 2/1993 | Dowden et al. | |
| 5,251,252 A | 10/1993 | Katz | 379/92 |
| 5,255,309 A | 10/1993 | Katz | 379/88 |
| 5,259,023 A | 11/1993 | Katz | 379/88 |
| 5,325,421 A | 6/1994 | Hou et al. | |
| 5,349,633 A | 9/1994 | Katz | 379/88 |
| 5,351,285 A | 9/1994 | Katz | 379/94 |
| 5,353,339 A | 10/1994 | Scobee | |
| 5,519,772 A | 5/1996 | Akman et al. | |
| 5,533,115 A | 7/1996 | Hollenbach et al. | |
| 5,553,119 A | 9/1996 | McAllister et al. | |
| 5,561,707 A | 10/1996 | Katz | 379/88 |
| 5,572,583 A | 11/1996 | Wheeler, Jr. et al. | |
| 5,581,600 A | 12/1996 | Watts et al. | |
| 5,583,920 A | 12/1996 | Wheeler, Jr. et al. | |
| 5,689,553 A | * 11/1997 | Ahuja et al. | |
| 5,692,033 A | 11/1997 | Farris | |

(List continued on next page.)

OTHER PUBLICATIONS

Stallings, William, 1995, ISDN and Broadband ISDN with Frame Relay and ATM, $3^{rd}$ edition, pp. 257–277.

Emerson, S. Thomas, "Voice Response Systems—Technology to the Rescue for Business Users", Speech Technology, pp. 99–103 (Jan./Feb. 1983).

Hester, et al., "The AT&T Multi–Mode Voice Systems—Full Spectrum Solutions for Speech Processing Applications", Proceedings of the 1985 AVIOS Conference, pp. 1, 3, 5, 7 and 9 (Sep. 1985).

Moosemiller, John P., "AT&T's Conversant I Voice System", Speech Technology, pp. 88, 90, and 92 (Mar./Apr. 1986).

Perdue, Robert J. and Eugene L. Rissanon, "Conversant 1 Voice System Architecture and Applications," AT&T Technical Journal, pp. 34–47 (Sep./Oct. 1986).

*Primary Examiner*—Duc Nguyen

(57) ABSTRACT

A transaction control layer for a signaling gateway that encapsulates multiple signaling systems into a single signaling interface for use by an advanced service node deployed in a telecommunications network. The transaction control layer performs call and resource state management functions for the advanced service node. The single state machine process has the capability of tracking different types of states for both calls and network resources (i.e., circuits) while using industry standards for call processing.

17 Claims, 10 Drawing Sheets

U.S. PATENT DOCUMENTS

| | | | | |
|---|---|---|---|---|
| 5,706,286 A | * | 1/1998 | Reiman et al. | |
| 5,742,905 A | | 4/1998 | Pepe et al. | |
| 5,793,771 A | * | 8/1998 | Darland et al. | 370/467 |
| 5,802,146 A | | 9/1998 | Dulman | |
| 5,805,675 A | | 9/1998 | Chanda | |
| 5,818,921 A | | 10/1998 | Vander Meiden et al. | |
| 5,825,752 A | * | 10/1998 | Fujimori et al. | 370/260 |
| 5,854,834 A | | 12/1998 | Gottlieb et al. | |
| 5,867,494 A | | 2/1999 | Krishnaswamy et al. | |
| 5,881,131 A | | 3/1999 | Farris et al. | |
| 5,881,135 A | | 3/1999 | Watts et al. | |
| 5,883,939 A | | 3/1999 | Friedman et al. | |
| 5,915,008 A | | 6/1999 | Dulman | |
| 5,917,900 A | | 6/1999 | Allison et al. | |
| 5,920,562 A | | 7/1999 | Christie et al. | |
| 5,923,659 A | | 7/1999 | Curry et al. | |
| 5,923,859 A | | 7/1999 | Melo et al. | |
| 5,926,524 A | | 7/1999 | Taylor | |
| 5,930,348 A | * | 7/1999 | Regnier et al. | 379/221 |
| 5,931,914 A | * | 8/1999 | Chiu | |
| 5,937,029 A | | 8/1999 | Yosef | |
| 5,946,386 A | | 8/1999 | Rogers et al. | |
| 5,953,389 A | | 9/1999 | Pruett et al. | |
| 5,956,396 A | * | 9/1999 | Ash | 379/220 |
| 5,974,252 A | | 10/1999 | Lin et al. | |
| 5,987,118 A | | 11/1999 | Dickerman et al. | |
| 5,987,331 A | * | 11/1999 | Grube et al. | 455/509 |
| 5,995,610 A | | 11/1999 | Smidt et al. | |
| 5,999,525 A | | 12/1999 | Krishnaswamy et al. | |
| 6,003,031 A | | 12/1999 | Hartikainen et al. | |
| 6,014,428 A | | 1/2000 | Wolf | |
| 6,018,567 A | | 1/2000 | Dulman | |
| 6,038,293 A | | 3/2000 | McNerney et al. | |
| 6,041,325 A | | 3/2000 | Shah et al. | |
| 6,044,142 A | | 3/2000 | Hammarstrom et al. | |
| 6,044,144 A | | 3/2000 | Becker et al. | |
| 6,044,259 A | | 3/2000 | Hentila et al. | |
| 6,081,591 A | * | 6/2000 | Skoog | |
| 6,104,803 A | | 8/2000 | Weser et al. | 379/230 |
| 6,108,410 A | | 8/2000 | Reding et al. | |
| 6,111,893 A | | 8/2000 | Volftsun et al. | |
| 6,122,345 A | | 9/2000 | Johnson | |
| 6,134,311 A | * | 10/2000 | Ekstrom | |
| 6,137,862 A | | 10/2000 | Atkinson et al. | |
| 6,144,727 A | | 11/2000 | Mashinsky | |
| 6,198,813 B1 | | 3/2001 | Pullen et al. | |
| 6,233,316 B1 | | 5/2001 | Schier et al. | |

* cited by examiner

CALL AND CIRCUIT STATE MACHINE FOR A TRANSACTION CONTROL LAYER OF A COMMUNICATIONS SIGNALING GATEWAY

CROSS-REFERENCE TO RELATED APPLICATIONS

This application is related to commonly-owned, co-pending applications filed concurrently herewith, entitled:

"Advanced Interactive Voice Response Service Node" having application number 09/073,880, filed on May 7, 1998;

"Telecommunications Architecture for Call Center Services Using Advanced Interactive Voice Response Service Nodes" having application number 09/074,096, filed on May 7, 1998;

"Interactive Voice Response Service Node with Advanced Resource Management" having application number 09/074,142, filed on May 7, 1998;

"Service Provisioning System for Interactive Voice Response Services" having application number 09/074,050, filed on May 7, 1998;

"Communications Signaling Gateway and System for an Advanced Service Node" having application number 09/074,072, filed on May 7, 1998;and "System for Executing Advanced Interactive Voice Response Services Using Service-Independent Building Blocks" having application number 09/073,887, filed on May 7, 1998.

The above applications are incorporated herein by reference in their entirety.

BACKGROUND OF THE INVENTION

1. Field of the Invention

The present invention relates generally to computer telephony, and more particularly to providing a signaling method for a communications signaling gateway to be used in conjunction with advanced service node platforms to handle calls on a telephone network.

2. Related Art

Service node platforms that provide enhanced call services are common in the telecommunications industry. The modern trend is to design and implement modular service nodes that may be placed anywhere throughout a telecommunications network. A common example of a service node is an Interactive Voice Response (IVR) service node. It is common for a business, who is a customer of a telecommunications service provider, to use IVR services in conjunction with call center services. The IVR service nodes are commonly used for customer call center routing. They perform processing of customer applications, based on one or more criteria selected by the customer, such as the dialed number of a call, Dialed number Identification Service (DNIS), Automatic Number Identification (ANI),. time of day, caller-entered digits, geographic point of call origin, etc. The IVR service nodes may also perform other IVR services such as automated servicing of callers for customers, caller surveys, telemarketing, and call parking until a call center has an available resource (e.g., a customer service agent).

Conventional IVR service nodes require specialized architectures as customers demand more customized IVR applications. Consequently, different types of IVR service nodes are implemented throughout a telecommunications network to handle different customer's IVR applications. This results in an inefficient network because a call needing a certain application must be routed to a certain IVR service node irrespective of that node's current load. Therefore, a next generation of service nodes will be designed to provide customized services for many different customers, all on a common platform.

A next generation of IVR service nodes will be complex computing platforms containing extensive software designed to perform a great number of functions. Any modification to the platform as a result of interface changes will require significant time, money and effort. Furthermore, the platform will be offered for sale to different telecommunications network carriers. These carriers most likely will utilize different network signaling systems. For example, most carriers in North America use the American National Standards Institute's (ANSI) Signaling System 7 (SS7), whereas many European carries use the International Telecommunications Union's (ITU) C7. Different signaling systems may even be employed in the same network.

For example, a carrier may use ANSI SS7 signaling for access and inter-exchange switching, while using ISDN Switch Computer Application Interface (SCAI) for automated call distributors (ACD). The SCAI is also an ANSI standard for Computer Telephony Integration (CTI) and is well known in the relevant art. To add to the problem, signaling systems undergo periodic updates and new version releases by standards bodies (e.g., ANSI, ITU, etc.). These all require interface modifications to any of the platforms located on a telecommunications network. Therefore, what is needed is a transaction control layer for a communications signaling gateway that encapsulates multiple communications network signaling systems into a single signaling interface for the platforms and tracks different type of states for both calls and network resources, such as circuits and ports.

SUMMARY OF THE INVENTION

The present invention is directed to a system and method for a signaling gateway transaction control layer (TCL) that encapsulates multiple signaling systems into a single signaling interface for use by a next generation service node (NGSN) deployed in a telecommunications network. The method includes receiving incoming messages from a graphical user interface (GUI), a switch on the network, or the NGSN. The TCL then performs initial processing of the incoming message. Initial processing checks the validity of the incoming message, and sends an appropriate response message, if necessary, to the NGSN and/or the switch. Also, statistics are generated for all incoming messages and invalid messages are alarmed. State-dependent processing of calls and resources on the NGSN is then performed. State-dependent processing involves retrieving call and resources state data, translating identification of resources between the switch and the NGSN; allocating resources on the NGSN to calls on switch; and storing state call and resource state data. Lastly, the TCL sends appropriate result messages to the NGSN and/or the switch.

An advantage of the present invention is that any network signaling system implementation variations, as well as detailed functions performed for call setup and resource management, are transparent to the service node. Furthermore, the TCL makes the signaling gateway compatible with various 1VR platforms.

Another advantage of the present invention is that by using a single process to track different states, several states can be related. This allows resource management to be performed for an entire NGSN.

Yet another advantage of the present invention is that is closely monitors the state of calls and resources. Therefore, the reason a call or circuit is blocked or otherwise unavailable can be known. Further features and advantages of the present invention as well as the structure and operation of various embodiments of the invention are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

Overview

The present invention is directed to a transaction control layer for a communications signaling gateway. A next generation service node (NGSN) provides a modular platform for advanced interactive voice response (IVR) services to customers of an IVR service provider. In a preferred embodiment of the present invention, a customer may have multiple call centers distributed geographically, all of which are accessed by a single toll-free number. A call to the toll free number is routed by a switch network to the NGSN. The NGSN then performs a customer IVR application, which may prompt the caller for certain information and collect other information (e.g., dialed number, caller ANI, etc.) from the network. Based on the information and possibly other information (e.g., time of day), the NGSN determines to which call center to route the call. The NGSN platform may be implemented in any telecommunications network using any of a variety of signaling systems. However, the NGSN platform is a complex computing platform with great costs associated with making any modifications thereto.

Therefore, it is desirable to have a communications signaling gateway that encapsulates multiple network signaling systems into a single signaling interface for the NGSN platforms to communicate with the network in which it is deployed—regardless of the switch networks signaling system. The object of the present invention is to provide a transaction control layer for the signaling gateway; to generate new messages that it sends to the network and the NGSN; perform call and resource state management; determine the next action needed by either the network's switches or the NGSN; and then send the appropriate message to communicate that action.

The present invention is described in terms of the above example environment. This is for convenience only and is not intended to limit the application of the present invention. In fact, after reading the following description, it will be apparent to one skilled in the relevant art how to implement the following invention in alternate embodiments.

Signaling Gateway Environment

Figure 1:
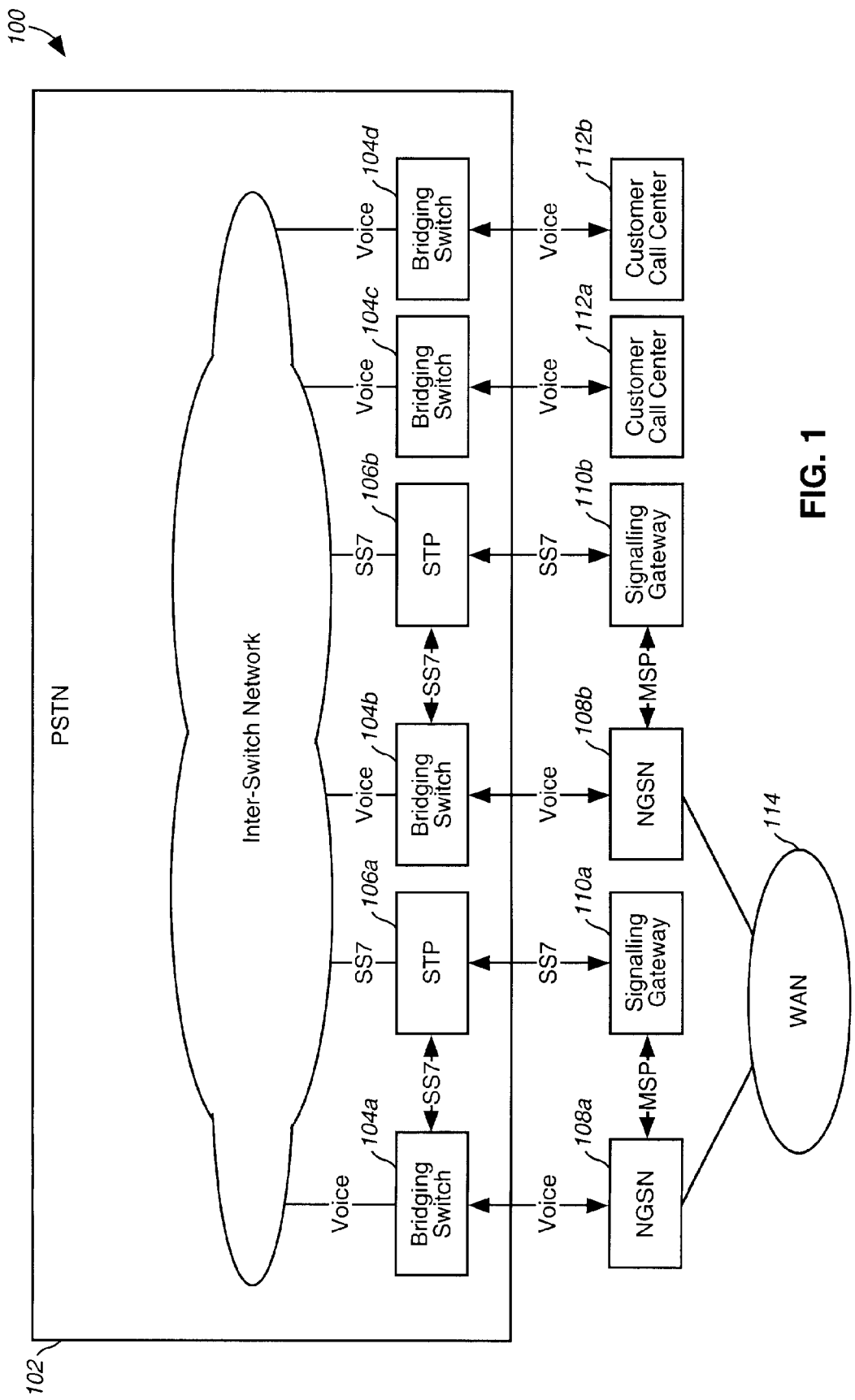
FIG. 1 is a block diagram illustrating the architecture of a telecommunications network in which the present invention would operate.

FIG. 1 is a block diagram illustrating the architecture of a telecommunications network 100. Network 100 uses a next generation service node (NGSN) 108 (shown as 108a, 108b) to perform IVR services. The NGSN 108 is a computing and telephony platform that includes a management workstation, a pair of redundant application servers, a shared disk array, and a plurality of intelligent peripherals. All of these components are connected via a local area network (LAN) within the NGSN 108. The NGSN 108 architecture is described in detail in a commonly-owned, co-pending application filed concurrently herewith, entitled "Advanced Interactive Voice Response Service Node" having application number TBA (Attorney Docket Number COS-97-040) which is incorporated herein by reference in its entirety. Additional special features of the NGSN 108 are described in detail in commonly-owned, co-pending application filed concurrently herewith, entitled "System for Executing Advanced Interactive Voice Responses Using Service-Independent Building Blocks" having application number TBA (Attorney Docket Number COS-97-046) and "Interactive Voice Response Service Node with Advanced Resource Management" having application number TBA (Attorney Docket Number COS-97-043), both of which are incorporated herein by reference in their entirety.

The NGSN 108 is connected to a bridging switch 104 (shown as 104a–104d), which provides access to a Public Switched Telephone Network (PSTN) (referred to as "switch network") 102. In a preferred embodiment, bridging switch 104 is a Northern Telecom DMS-250 digital matrix switch that supports Release Link Trunk (RLT) voice connections to the NGSN 108 and is well known in the relevant art.

Modern switch networks (e.g., PSTN 102) commonly use an out-of-band signaling system. In North America, ANSI SS7 is typical whereas in Europe, ITU C7 is used. In network 100, a signaling gateway 110 communicates with the bridging switch 104, via a signal transfer point (STP) 106, using SS7. The STP 106 performs switching and routing of SS7 signaling messages among various switches in the switch network 102, as well as among other components. The NGSN 108 is connected to the STP 106 via the signaling gateway 110. Use of the signaling gateway 110 insulates the NGSN 108 from whatever type of signaling system is used in the switch network 102. In other words, signaling gateway 110 translates between the signaling protocol used in switch network 120, and the proprietary signaling protocol used in NGSN 101 by the telecommunications service provider. Signaling gateway 110 also performs resource management and call state management for the NGSN 108.

FIG. 1 further illustrates how the architecture of network 100 may be scaled. A plurality of the NGSN 108 nodes (shown as NGSNs 108a and 108b) may be connected to the switch network 102 and deployed at various locations. Each NGSN 108 node is connected to the switch network 102 via one of the plurality of bridging switches 104 (shown as bridging switches 104a–104d) using voice trunks. Each bridging switch 104 is part of the switch network 102. Furthermore, each NGSN 108 is connected to a signaling gateway 110 (shown as signaling gateways 110a and 110b) via data links. In turn, each signaling gateway 110 is connected to one of the plurality of STPs 106 (shown as STPs 106a and 106b), which are also part of the switch network 102. Each NGSN 108 is linked to a wide area network (WAN) 114. The WAN 114 provides each NGSN 108 access to the other components of the NGSN network as described in further detail in a commonly-owned, co-pending application filed concurrently herewith, entitled, "Telecommunications Network Architecture for Call Center Services using advanced Interactive Voice Response Service Nodes" having application number TBA (Attorney Docket Number COS-97-042) which is incorporated herein by reference in its entirety.

FIG. 1 also reflects the fact that multiple call centers 112 (shown as call centers 112a and 112b) may be added to the network 100, each served by the plurality of the NGSN 108 nodes. Any call to a customer may be first routed to any NGSN 108, and then routed to any, or to a particular, call center 112. There may be one or multiple NGSN 108 nodes connected to one of the plurality of bridging switches 104, as well as one or multiple call centers 112 connected to one of the plurality of bridging switches 104.

Call Processing

When a call is routed to the NGSN by the PSTN 102, the call is sent to the bridging switch 104 that is connected to the NGSN 108. The call is then carried via voice trunks to the NGSN 108. The bridging switch 104 sends SS7 signaling for the call to the NGSN 108 via the STP 106 and the signaling gateway 110. Signaling for the call is carried over SS7 data links to the STP 106. The STP 106 routes SS7 messages for the call to the signaling gateway 110.

The signaling gateway 110 translates the SS7 signaling to a telecommunication service provider's proprietary signaling protocol (PSP). Use of the signaling gateway 110 and a PSP insulates the NGSN 108 from SS7 (or whatever signaling system is in use by the switch network 102). Service nodes such as the NGSN 108 utilize the functionality contained within SS7 integrated services digital network user part (ISUP) messages for transaction control and resource management. The signaling gateway 110 receives ISUP messages from the STP 106, which were originally generated by the bridging switch 104. The signaling gateway 100 uses ISUP messages in an internal ISUP state machine to perform control and resource management functions. After determining the state of the call and the function needed, the signaling gateway 110 then generates and sends a PSP message to communicate the function needed to the NGSN 108.

The signaling gateway 110 also receives PSP messages from the NGSN 108. It processes these in the same way, to trigger state changes in its internal state machine, determine current call state, and determine functions needed. It then generates an SS7 ISUP message to communicate this information, and then sends an ISUP message to the bridging switch 104 via the STP 106.

A key advantage to the signaling gateway 110 is the generation and use of a PSP as a single signaling interface for the NGSN 108. A PSP encapsulates the high-level functions of service node signaling messages, such as SS7 ISUP messages, into a set of common messages. Many of the detailed call setup functions performed with SS7 ISUP are handled by the signaling gateway 110. Call and resource state management are also performed by the signaling gateway 110. The PSP messages that are sent to the NGSN 108 specify high-level functions needed by the call, such as a request for a port for a call offered to the NGSN 108, or a call release to the bridging switch 104 with RLT.

Further details on call processing, the signaling gateway 110 and a preferred embodiment of a PSP are described in commonly-owned, co-pending applications filed concurrently herewith, entitled "System for Executing Advanced Interactive Voice Response Services Using Service-Independent Building Blocks" having application number TBA (Attorney Docket Number COS-97-046); and "Communications Signaling Gateway and System for an Advanced Service Node" having application number TBA (Attorney Docket Number COS-97-044) which are incorporated herein by reference in their entirety. However, Table 1 reproduces and describes a set of twelve PSP functions defined for the network 100 according to a preferred embodiment. Each PSP function either returns a "Return_Result," "Return_Error," or "Return_Reject" under appropriate circumstances as will be shown below.

TABLE 1

| PSP FUNCTION | DESCRIPTION |
| --- | --- |
| Activate_Port | The Activate_Port invoke operation notifies the application when a resource (or resource set) has been unblocked by the call network and is again available to support call processing. This component is used to provide resource management information. |
| Answer | The Answer invoke operation notifies the application when the called party has answered the call. This component is for outgoing calls. |
| Call_Offered | The Call_Offered component presents an inbound call to an application. Since this invoke operation is the beginning of the call, it is sent in a "begin dialog" message to initiate the dialog. This component carries, as parameters, a resource to the application port that the call came in on, and a number of parameters from a SS7 ISUP IAM message. |
| Connected | The Connected component notifies the call processing application that the voice path on an incoming call has been connected. |
| Logoff | The Logoff component identifies a resource that is no longer available. The component may contain a single, list, or range of resources. It also carries the reason for logging the resource/application off (i.e., Normal or Alarm). |
| Logon | The Logon function identifies a resource that has become available and may contain a list or range. |
| Make_Call | This invoke operation initiates an outbound call. It carries many of the parameters to be used to build a SS7 IAM. The actual port used is selected by the signaling gateway 110, and a handle is returned as a result for the Make_Call operation. |
| Release | The Release function is sent to the signaling gateway 110 by the call processing application to initiate a release or RLT. A simple release is accomplished with a SS7 FAR message. RLT is accomplished with a SS7 Facility Request (FAR) message indicating RLT. |
| Release_Notice | The Release_Notice function informs the call processing application of a network release. |
| Loop_Port | The Loop_Port component notifies the call processing platform to loop (bridge together) the send and receive lines on the specified resource. |
| UnLoop_Port | The UnLoop_Port component notifies the call processing platform to unloop (unbridge) the send and receive lines on the specified resource. |

TABLE 1-continued

| PSP FUNCTION | DESCRIPTION |
| --- | --- |
| Deactivate_Port | The Deactivate_Port invoke operation notifies the application when a resource (or resource set) has been blocked by the call network and is no longer available to support call processing. This component is used to provide resource management information. |

Signaling Gateway Architecture

Figure 2:
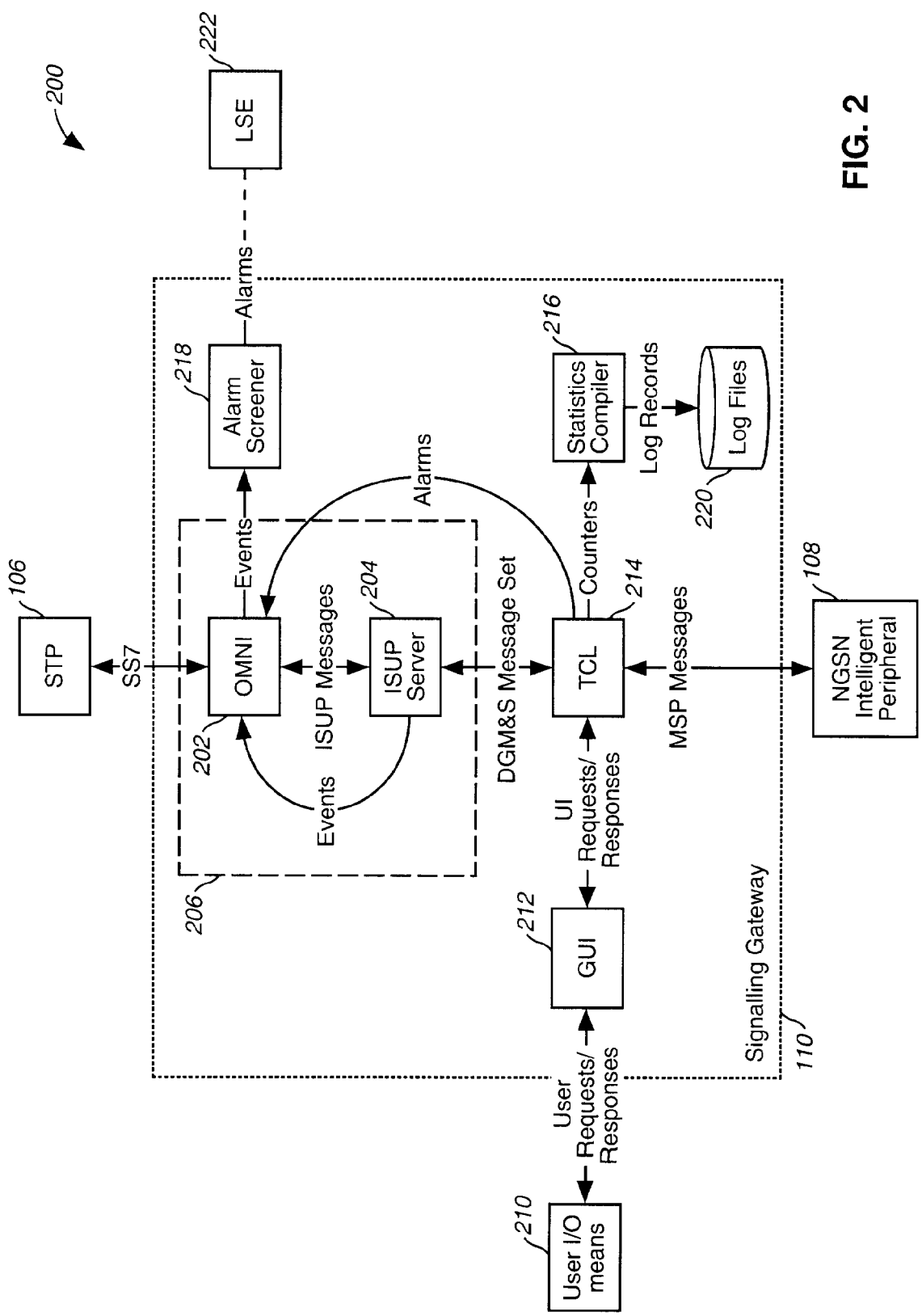
FIG. 2 illustrates the architecture and process flow of a signaling gateway according to a preferred embodiment of the present invention.

FIG. 2 illustrates the architecture 200 and process flow of a preferred embodiment of the signaling gateway 110. The signaling gateway 110 is a high-performance mid-range computer, such as an IBM RS/6000 (available from Internal Business Machines of Armonk, N.Y.) running the UNIX/AIX operating system.

Signaling gateway 110 includes a signaling point (SP) interface process 206 which is a communications driver and message server that provides an interface to a particular signaling system. The SP interface 206 process manages low level communications with the STP 106 and also performs low-level message server functions. For example, SP interface 206, for ANSI ISUP, manages communications with the STP 106 to exchange SS7 messages with a digital matrix switch or service switch point (e.g., bridging switch 104). It extracts an ISUP from the application layers of SS7 messages, and passes the ISUP equivalent message to a transaction control layer (TCL) 214.

In a preferred embodiment of signaling gateway 110, the SP interface process 206 is provided by an OMNI Soft Platform™ (available from DGM&S Telecom of Mt. Laurel, N.J.) which is a product suite that provides an ANSI SS7 interface 202. Interface 202 comprises SS7 network cards and communications software for interfacing with SS7 networks. The OMNI Soft Platform™ product suite also provides an ISUP server 204 (shown separately in FIG. 2 for illustrative purposes). Interface 202 receives SS7 messages directly from the STP 106, and extracts the ISUP message layer. The ISUP server 204 formulates the ISUP message into a DGM&S proprietary message set, while still maintaining ISUP message parameters. The ISUP server 204 then passes the ISUP equivalent message to the TCL 214.

In alternate embodiments of the signaling gateway 110, one or more types of SP interface processes 206 are included to interface to particular signaling systems found on network 102. In FIGS. 1 and 2, a preferred embodiment of the signaling gateway 110 is shown providing an ANSI SS7 interface to the NGSN 108 IVR platform. Other embodiments are possible with similar architectures. There are other signaling systems, such as ITU C7, which is common in Europe, and ISDN Switch Computer Application Interface (SCAI), which is commonly used for signaling between automatic call distributors (ACDs) and service nodes. The signaling gateway 110 encapsulates these different signaling systems from the NGSN 108, so that the same NGSN 108 may be deployed in any network using any signaling system without requiring further development or any customization.

The TCL 214 receives ISUP messages from the ISUP server 204. It uses these messages to trigger an appropriate state change in the current call, as well as any resources used for the call. It then determines the next action needed by either the bridging switch 104, the NGSN 108, or both. It creates an ISUP message for communicating any actions needed to the bridging switch 104, and a PSP message for communicating any actions needed to the NGSN 108. The TCL 214 sends PSP messages directly to the intelligent peripheral located on the NGSN 108 via the NGSN 108 LAN, using TCP/IP. The TCL 214 sends ISUP messages to the ISUP server 204. Interface 202 then creates the lower level (e.g., MTP1, MTP2, MTP3, etc.) SS7 message structures, and sends the SS7 message to the bridging switch 104 via the STP 106.

The signaling gateway 110 also has a GUI 212 process that is connected to a user input/output (I/O) means 210. The I/O means 210 may be a keyboard and monitor connected directly to the signaling gateway 110 computer, or a personal computer workstation connected via a LAN to the signaling gateway 110 computer. The GUI 212 and user I/O means 210 allow users to issue queries to the TCL 214 for current call or resource states, configure certain parameters, reads statistics from log files, validate circuits, or block and unblock circuits manually.

An alarm screener 218 generates alarms based on messages received from the SP interface processes 206, the NGSN 108, or the signaling gateway 110 operating system's (e.g., UNIX/AIX) messages. The alarm screener 218 sends these alarms to a Local Support Element (LSE) 222 via the management workstation located on NGSN 108 (not shown in FIG. 2). The LSE is a computer connected to the NGSN 108 via a WAN. The LSE collects alarms from many network elements, and provides a single point of interface for monitoring network alarms.

A statistics compiler 216 tracks statistics generated by the signaling gateway 110. These include number of calls received, inbound versus outbound calls processed, average call handling times, etc. The statistics compiler 216 records statistical data to a local log files database 220.

TCL State Machine Processing

Figure 3:
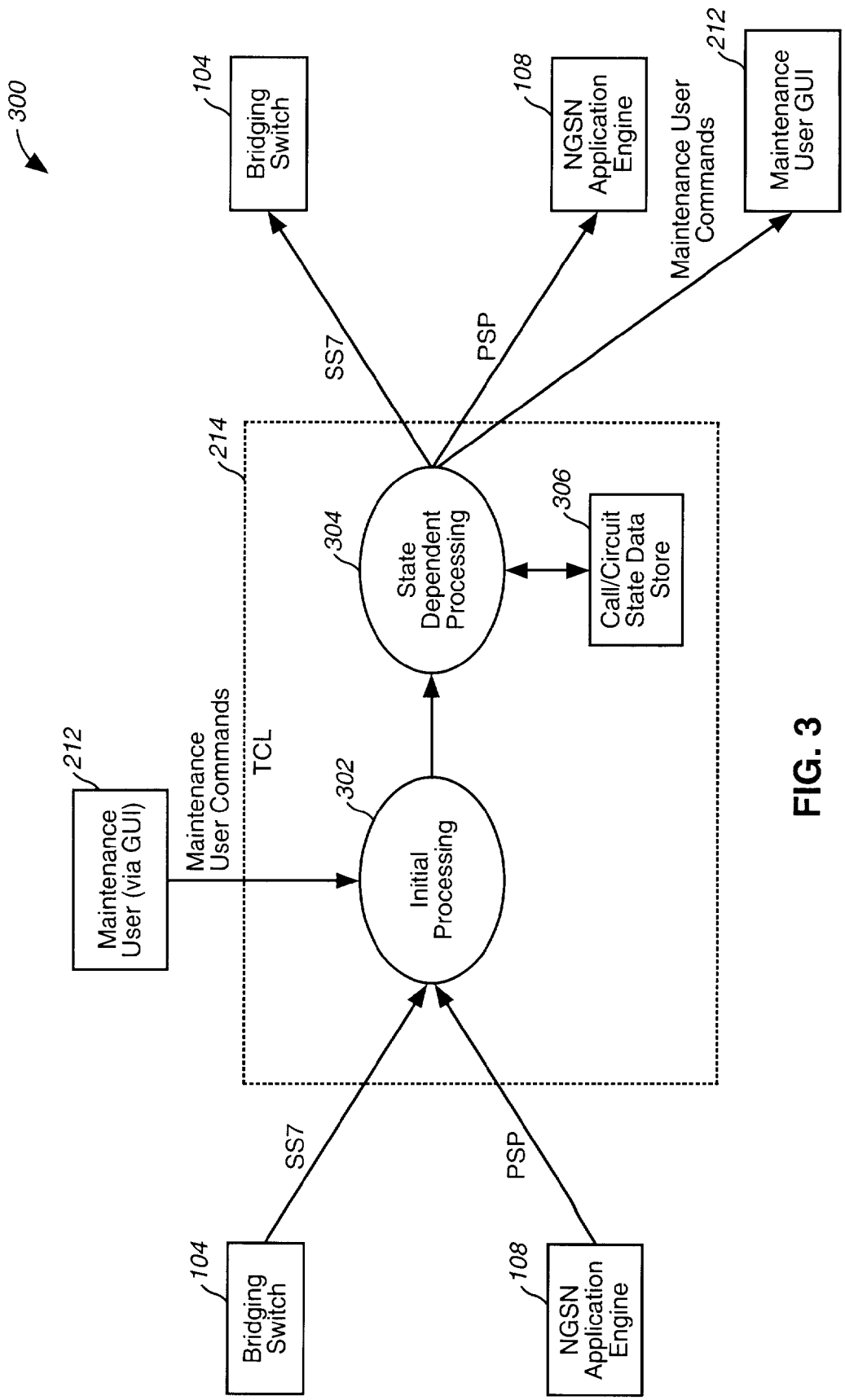
FIG. 3 illustrates the process flow of a transaction control layer according to the present invention.

FIG. 3 illustrates a three-step processing flow 300 performed by the TCL 214. First, TCL 214 receives SS7 ISUP messages from the bridging switch 104, via the STP 106, communications interface 202, and ISUP server 204 processing thread. The thirty SS7 ISUP messages that are supported by the signaling gateway 110 are well known in the relevant art. However, for completeness, they are reproduced in Table 2. This subset of SS7 ISUP messages are supported because they are the ones pertinent to IVR services. In alternate embodiments of the present invention, the messages of whatever signaling system being used by the switch network 102 (e.g., ITU C7 in Europe) that are pertinent to IVR services will be supported by the TCL 214.

TABLE 2

SUPPORTED ANSI SS7 ISUP MESSAGES

| | |
| --- | --- |
| Address Complete Message (ACM) | Continuity Check Request Message (CCR) |
| Answer Message (ANM) | Continuity Message (COT) |
| Block Acknowledgment Message (BLA) | Facility Reject Message (FRJ) |
| Blocking Message (BLO) | Facility Accept Message (FAA) |
| Call Progress Message (CPG) | Facility Request Message (FAR) |
| Circuit Group Blocking Message (CGB) | Initial address message (IAM) |
| Circuit Group Blocking Acknowledgment Message (CGBA) | Loopback Acknowledgment Message (LPA) |
| Circuit Group Reset Message (GRS) | Release Complete Message (RLC) |
| Circuit Group Reset Acknowledgment Message (GRA) | Reset Circuit Message (RSC) |
| Circuit Group Unblocking Message (CGU) | Release Circuit Message (REL) |
| Circuit Group Unblocking Acknowledgment Message (CGUA) | Resume Message (RES) |
| Circuit Query Message (CQM) | Suspend Message (SUS) |

TABLE 2-continued

SUPPORTED ANSI SS7 ISUP MESSAGES

| | |
|---|---|
| Circuit Query Response Message (CQR) | Unblocking Message (UBL) |
| Circuit Validation Response Message (CVR) | Unblocking Acknowledgment Message (UBA) |
| Circuit Validation Test Message (CVT) | Unequipped Circuit Identification Message (UCIC) |

The TCL 214 also receives PSP messages from an application engine located on the NGSN 108. The TCL 214 may also receive commands from a maintenance user, via the GUI 212. These commands are to perform certain functions manually, such as apply a block to a circuit. The TCL 214 then performs initial processing 302 on the SS7 ISUP, PSP, or maintenance command messages.

Initial processing 302 for SS7 messages from bridging switch 104 includes general validation of the messages and message specific processing. General validation ensures that the SS7 ISUP message sent to the signaling gateway 110 does not include a circuit identification code (CIC) of a circuit not equipped on the NGSN 108 platform. If so, the signaling gateway will respond with a SS7 unequipped circuit identification code (UCIC) message.

Other initial processing ensures the received message is received in an expected state. If it is received in an unexpected state, TCL 214 will take appropriate action to resynchronize the state. For example, TCL 214 may alarm, and possibly send a RSC message.

Message specific processing, as part of initial processing 302, is then performed for each of the SS7 messages recognized by the signaling gateway 110 (see Table 2). Specific message processing is defined in TCL 214 for receiving every possible message in every possible state. This processing involves sending the proper SS7 response to the bridging switch 110 and/or the proper PSP response to the NGSN 108. If a SS7 message is received that is not recognized by the signaling gateway 110, it is ignored and logged to the statistics compiler 216.

Initial processing 302 for PSP messages from the NGSN 108 first ensures that the message is one of the defined PSP functions (see Table 1). If it is not valid, it will be rejected and the TCL 214 will return an appropriate Return_Reject message to the NGSN 108. An appropriate Return_Reject message will also be sent by the TCL 214 if a message from the NGSN 108 is missing data or contains format errors. Initial processing 302 on the TCL 214 will also generate and transmit an appropriate Return_Error message to the NGSN 108 when requests may not be accomplished due to resource limitations (e.g., a Make_Call when no switch circuits are available). Other initial processing ensures the received message is received in an expected state. If it is received in an unexpected state, the TCL 214 will take appropriate action to resynchronize the state. For example, the TCL 214 may alarm, and possibly send a Reset Circuit (RSC) message.

For valid messages, initial processing 302 will return an appropriate Return_Result as an acknowledgment for any action taken. In general, messages that are processed successfully will return a Return_Result; messages that cannot be processed due to a problem with the message format or message field contents will return a Return_Reject; and messages that cannot be processed because the requested operation cannot be performed will return a Return_Error. All Return_Error and Return_Reject messages will be logged and alarmed via alarm screener 218.

Initial processing 302 for maintenance user (command) messages involves validating that the message is one recognized by the TCL 214, verifying the mapping to a circuit is valid, checking for needed processing due to network congestion, and processing the message based on current call state. Table 3 lists eight user inputs defined for maintenance user messages inputted by I/O means 210 via GUI 212.

TABLE 3

Maintenance User Messages

| | |
|---|---|
| Block_Circuit | Block_Group |
| Unblock_Group | Unblock_Circuit |
| Reset_Circuit | Reset_Group |
| Circuit_Query | Circuit_Validation |

Second, after performing initial processing 302 on an incoming message, the TCL 214 process performs valid state-dependent processing 304. The TCL 214 includes a single state machine process that tracks the states of both calls and resources—specifically, resources are circuits between the bridging switch 104 and the NGSN 108. Call and resource states are managed based on both SS7 ISUP messages from the bridging switch 104 and PSP messages from the application engine located on the NGSN 108.

These various states are tracked by a single TCL 214 process, so that the signaling gateway 110 may map calls to resources. For example, if the NGSN 108 needs to place an outbound call to the bridging switch 104, the signaling gateway 110 knows which circuits are available. The signaling gateway 110 also knows, of unavailable circuits, which ones are unavailable due to a blocking condition applied by a maintenance user via the GUI 212 and which ones are unavailable due to processing of a current call. State tracking is performed by the TCL 214's state-dependent processing 304 using a call/circuit state data store 306. The data store 306 may be any of various means, such as an object database, a relational database, a simple table, or the like.

The TCL 214 also translates identification of resources between the bridging switch 104 and the NGSN 108. For example, the TCL 214 translates the circuit identification code (CIC) provided by the bridging switch 104 in a SS7 Facilities Accepted message (FAA) to an intelligent peripheral port on the NGSN 108. The TCL 214 then provides the NGSN 108 intelligent peripheral port identifier to the application engine located on the NGSN 108 in an PSP "Connected" message, so that the application engine located on the NGSN 108 knows on which intelligent peripheral port to apply the call treatment.

Third, needed signaling as a result of state-dependent processing 304 are sent to the bridging switch 104 in SS7 ISUP messages, to the application engine located on the NGSN 108 as PSP messages, and to the GUI 212. These messages, convey information regarding call and resource states, as well as solicit additional actions from the bridging switch 104, the NGSN 108, and the GUI 212 respectively. The bridging switch 104, the NGSN 108, and GUI 212 are each shown twice in FIG. 3 for convenience of explaining process flow 300, but each instance represents the same physical component.

Call State Processing Overview

Incoming call state processing is performed for calls offered by the bridging switch 104 to the NGSN 108. This process will be described below with reference to FIGS. 4A–C. Outgoing call state processing is performed for calls that the NGSN 108 places to the bridging switch 104. This is typically done when the NGSN 108, in the course of processing an incoming call, determines that the incoming call needs to be transferred to another location in the network 100. The NGSN 108 places an outbound call to the bridging switch 104, and connects the inbound call leg with the outbound call leg. This connection may either be done at the bridging switch 104 using RLT, or it may be done at the intelligent peripheral located on the NGSN 108 using two ports and two bridging switch-to-intelligent peripheral circuits for the duration of the call. Outgoing call state processing will be described in detail below with reference to FIG. 5.

Resource (Circuit) State Processing Overview

There are three types of states kept in the TCL 214: (1) call processing call states, (2) transient call processing states, and (3) transient management call states. These states are described below in Table 4.

TABLE 4

| STATE | DESCRIPTION |
|---|---|
| (1) CALL PROCESSING | |
| Unequipped | CIC not associated with a TCP/Span/Channel (not configured at TCL). |
| Idle | CIC is available, and not involved in a call. |
| Idle Locally Blocked | CIC is not involved in a call, and is locally blocked. |
| Idle Remotely Blocked | CIC is not involved in a call, and is blocked at the remote exchange. |
| Idle Locally/remotely Blocked | CIC is not involved in a call, and is both locally and remotely blocked. |
| Incoming Busy | CIC is in the conversation phase (connected) of an incoming call. |
| Incoming Busy, Locally Blocked | CIC is in the conversation phase of an incoming call, and is locally blocked. |
| Incoming Busy, Remotely Blocked | CIC is in the conversation phase of an incoming call and is blocked at the remote exchange. |
| Incoming Busy, Locally/Remotely Blocked | CIC is in the conversation phase of an incoming call and is blocked both locally and remotely. |
| Outgoing Busy | CIC in the conversation phase (connected) of an outgoing call. |
| Outgoing Busy, Locally Blocked | CIC is in the conversation phase of an outgoing call and is locally blocked. |
| Outgoing Busy, Remotely Blocked | CIC is in the conversation phase of an outgoing call and is blocked at the remote exchange. |
| Outgoing Busy, Locally/Remotely Blocked | CIC is in the conversation phase of an outgoing call and is blocked both locally and remotely. |
| (2) TRANSIENT CALL PROCESSING | |
| TransACM | Waiting for ACM after having sent JAM. |
| TransRLC | Waiting for RLC after having send REL or RSC. |
| TransCOT | Waiting for COT resulting from a previously received IAM with continuity test, and after the Loop Port return result has been received. |
| TransIdleCOT | Waiting for a REL or COT that are to occur due to a previously received CCR message, and after the Loop Port return result has been received. |
| TransPrevCOT | Waiting for a COT resulting from a previously received IAM with continuity test of a circuit on a previous exchange. |
| TransCCR | Waiting for a CCR that is to occur after a previous inbound continuity test has failed. |
| TransUnloopRRtoNewCall | Waiting for an UnLoopPort return result, so that a call can be placed to the call processing application after the unloop port is received. Occurs when an IAM with continuity test indication is received and the continuity test passes. |
| TransUnloopRRtoRLC | Waiting for an UnLoopPort return result from the call processing application, so that an RLC can be sent to the network. Occurs after an inbound continuity test is stopped by receiving a REL message. |
| TransCCRUnloopRR | Waiting for both a CCR from the network and an UnloopPort return result message from the call processing application. Occurs after an inbound continuity test failed and an UnLoop Port message is sent. |
| TransUnloopRRtoLoop | Waiting for an UnLoopPort return result message from the call processing application, so that a new loop port message can be sent to the call processing application. Occurs after the previous inbound continuity test failed, and a CCR was immediateiy received to restart a new inbound continuity test before an UnLoop Port return result is received. |
| TransUnloopRR | Waiting for an UnLoopPort return result from the call processing application, to clear the CIC state back to |

TABLE 4-continued

| STATE | DESCRIPTION |
| --- | --- |
| | idle. |
| TransRLCUnloopRR | Waiting for both an RLC from the network and an UnLoop Port return result from the call processing application to clear the CIC state back to idle. Occurs when the TCL originates a release or a reset circuit for a busy CIC, and the call processing application leg is active and involved in a loop port. |
| TransRelNoticeRR | Waiting for a Release Notice return result from the call processing application to clear the CIC state back to idle. |
| TransRelNoticeRRtoRLC | Waiting for a Release Notice return result from the call processing application to send an RLC to the network. Occurs when a REL was received and the CIC was involved in a call. |
| TransRelNoticeRRtoREL | Waiting for a Release Notice return result to send a REL to the network. Occurs when the TCL initiates the release of a call due to, for example, receiving an RLC while a call is active. |
| TransRLCRelNoticeRR | Waiting for both an RLC from the network and a Release Notice return result from the call processing application. Occurs when the TCL originates a release or a reset circuit for a busy CIC, and the leg is active and involved in a call. |
| TransCOTLoopRR | Waiting for both a COT from the network and a Loop Port return result from the call processing application. Occurs when a Loop Port is sent to the call processing application as a result of a previously received IAM with continuity test indication. |
| TransLoopRRtoLPA | Waiting for a Loop Port return result from the call processing application, to then send an LPA message back to the network. Occurs when a Loop Port is sent to the call processing application as a result of a previously received CCR message. |
| (3) TRANSIENT MANAGEMENT CALL PROCESSING | |
| Await Block Ack | Sent a BLO waiting for a BLA. |
| Await Group Block Ack | Sent a CGB waiting for a CGBA. |
| Await Unblock Ack | Sent a UBL waiting for a UBA. |
| Await Group Unblock Ack | Sent a CGU waiting for a CGUA. |
| Await GrouD Reset Ack | Sent a GRA waiting for a GRA. |

The signaling gateway 110 handles standard ISUP maintenance message processing described in ANSI T1.113-1992. Circuit maintenance can be applied by the bridging switch 104, the TCL 214, or a maintenance user via the GUI 212. Circuit maintenance consists of the standard ISUP activities: block, unblock, reset circuit, circuit validation, as well as circuit query.

Figure 6:
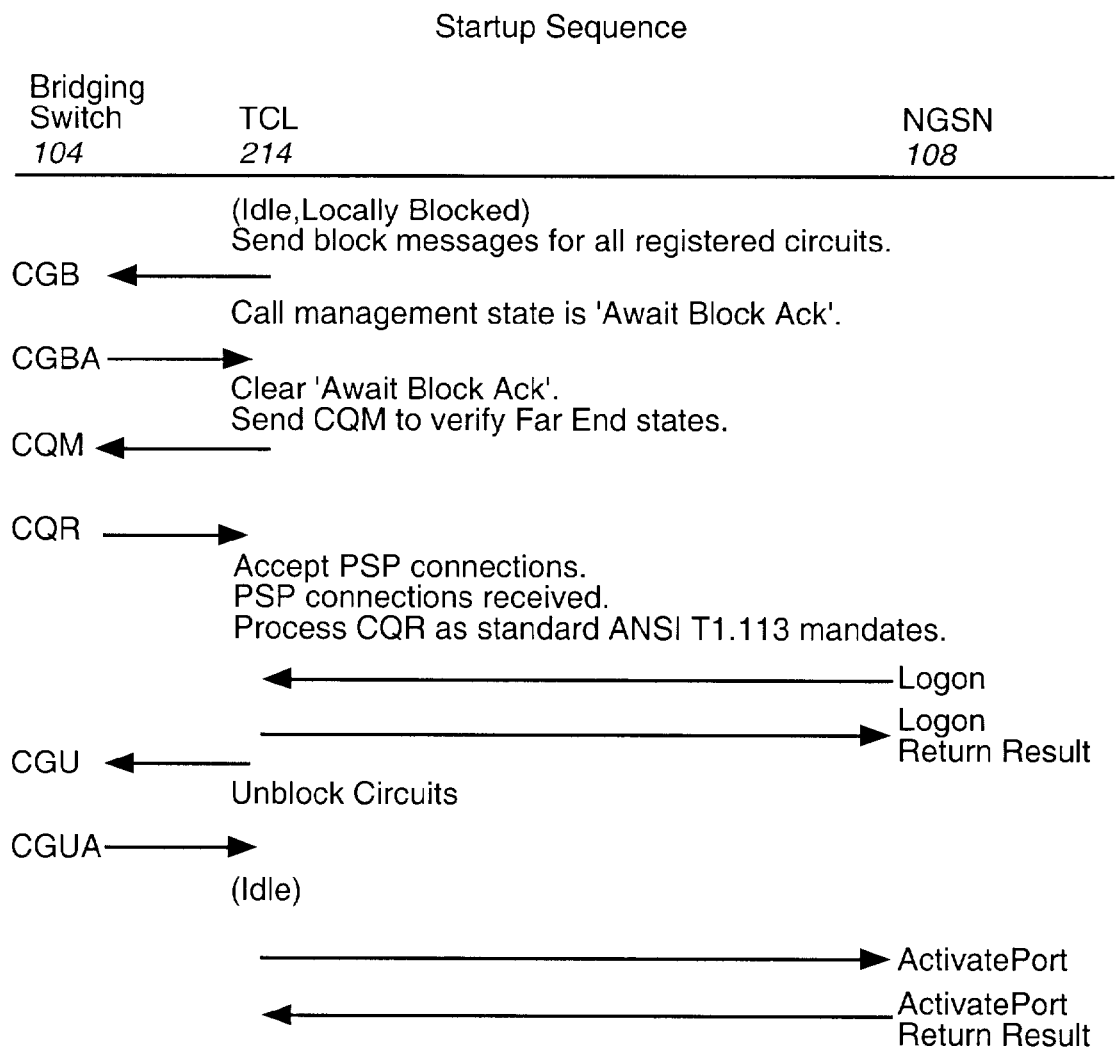
FIG. 6 is a call flow illustrating the transaction control layer-next generation service node startup sequence with call management states according to a preferred embodiment of the present invention.

The TCL 214 receives circuit maintenance messages from the bridging switch 104, and acts upon them based on state-dependent processing 304. The TCL 214, itself, can generate blocking, unblocking, circuit query, and reset messages which result from state-dependent processing of other messages. The NGSN 108 may also perform a circuit logon, circuit logoff, or abort indication, which result in Unblock_Circuit, Block_Circuit, or Reset_Circuit maintenance messages, respectively, from the TCL 214. The NGSN 108 at startup of the signaling gateway 110 provides some message signaling to determine which circuits are available. The startup process is described below with reference to FIG. 6. An example of logoff/logon from the NGSN 108 which results in blocking/unblocking from TCL 214 is described below with reference to FIG. 7.

Detailed Examples of TCL State Processing

Processing flow 300 is performed by the TCL 214 for call state processing—(1) incoming calls processing; (2) outgoing calls processing—and for resource (circuit) state processing—(3) local circuit maintenance blocking states processing; and (4) remote maintenance blocking states processing.

1. Incoming Call States Processing

Figure 4A:
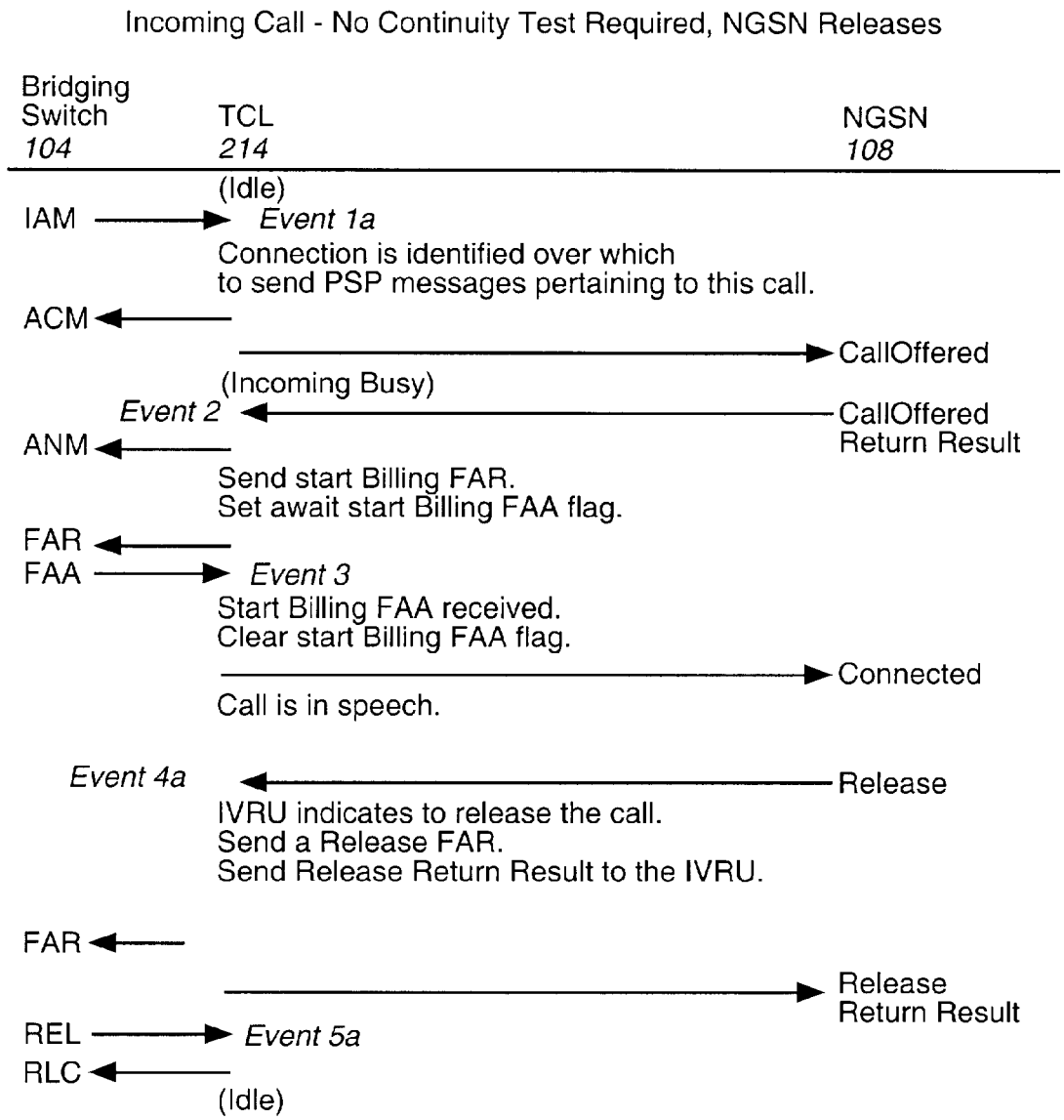
FIGS. 4A–C illustrate call flows for incoming call states processing performed by the transaction control layer according to the present invention.
Figure 4B:
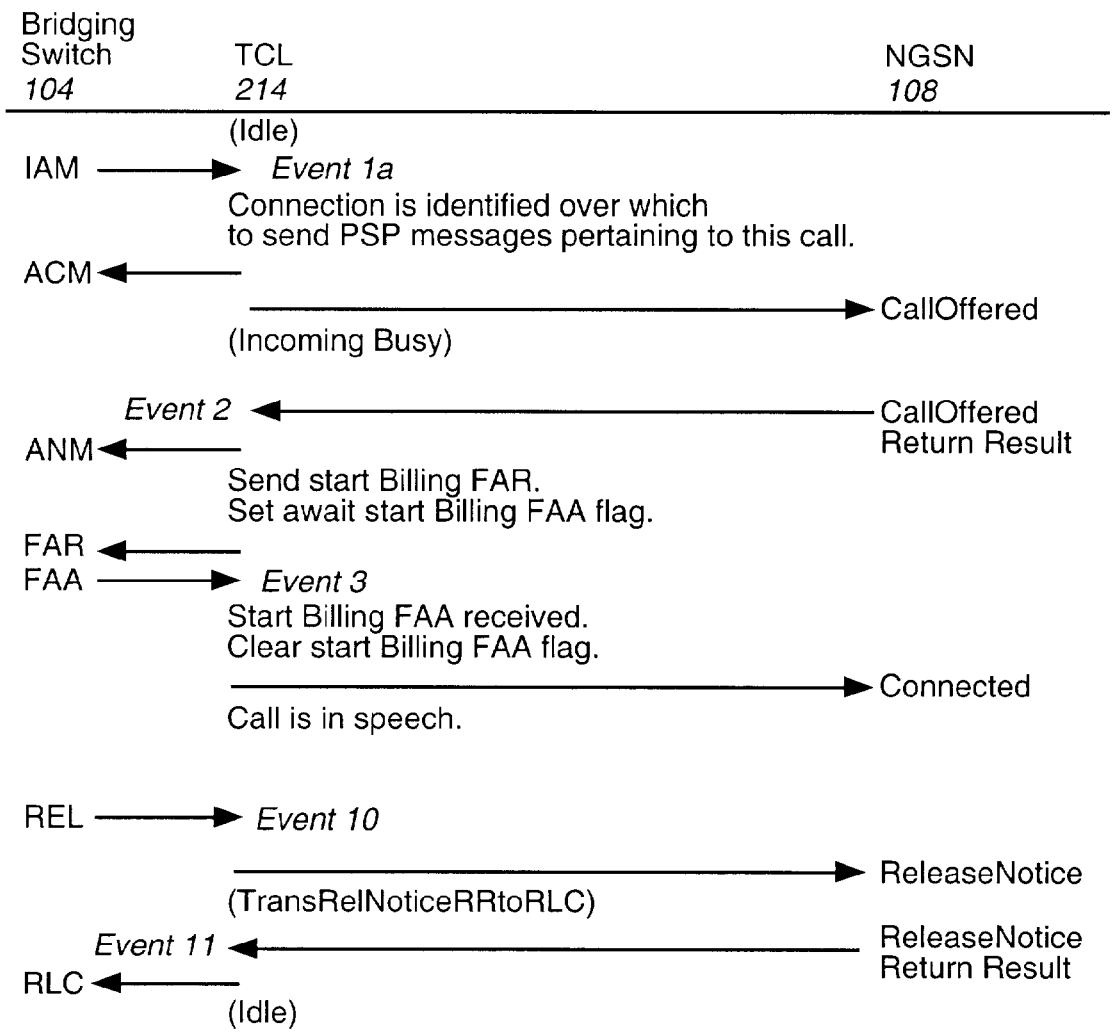
Figure 4C:
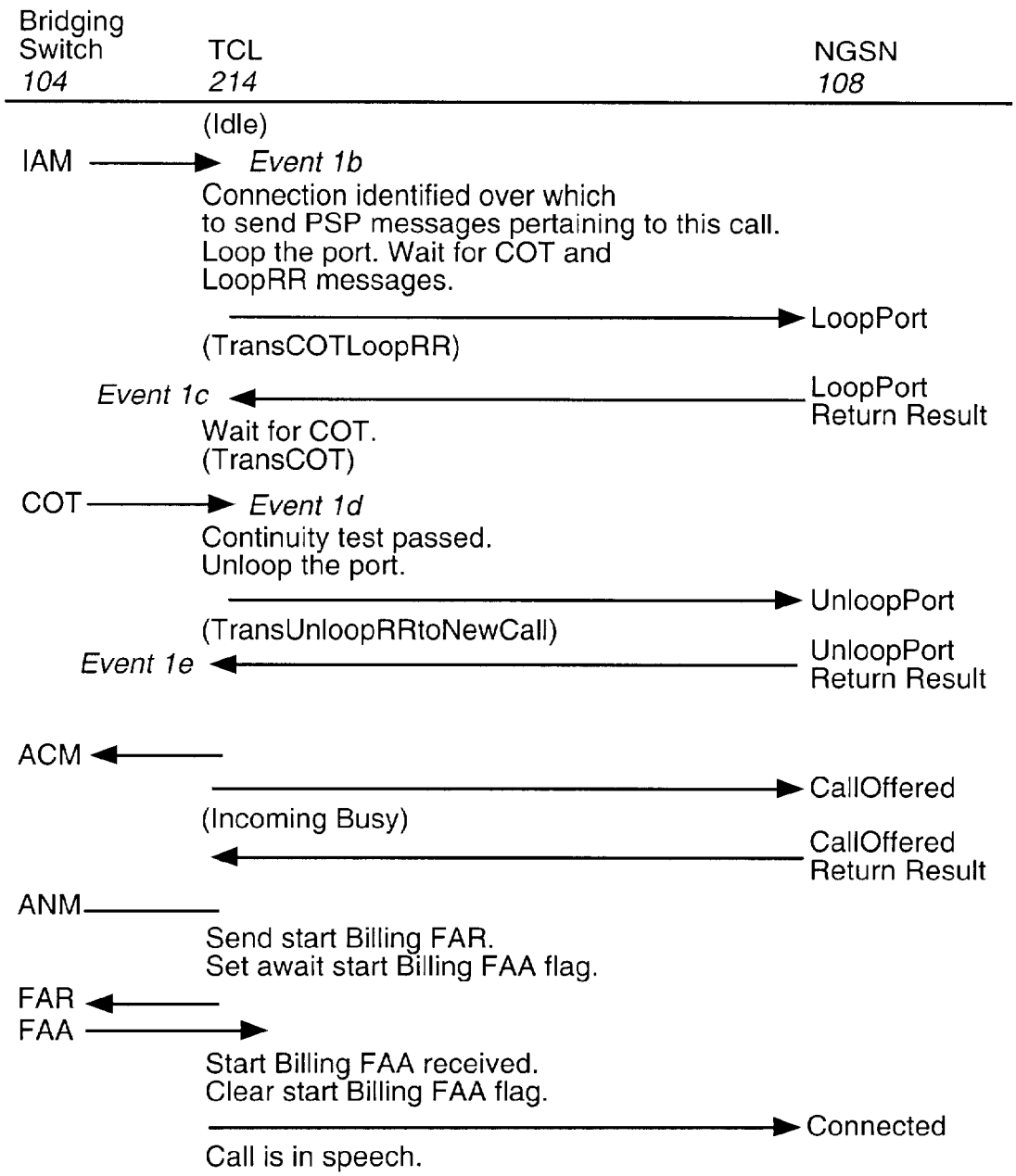

FIGS. 4A–C are call flows illustrating the incoming call states processing 400 performed by the TCL 214 in a preferred embodiment. FIGS. 4A–C illustrate the states that a current call may have within the TCL 214, the messages that trigger state transitions, and actions performed by the TCL 214. General processing is described below. It should be noted that not all events described herein appear in FIGS. 4 A–C (and FIGS. 5–7 to follow). Events related to the unique processing of the TCL 214 are highlighted, however, events related to standard ANSI ISUP processing, which will be apparent to one skilled in the relevant art, are not shown.

A circuit is referenced by its CIC. At any one time, the state of a CIC may be idle, involved in an incoming call, involved in an outgoing call, or transient. The call states of a CIC are listed in Table 4 above. FIGS. 4A–C illustrate the transitions when a CIC is involved in an incoming call. Transition from state to state is triggered by events. An event is generally the receipt of an SS7 or PSP message, but may also be expiration of a timer. Receipt of SS7 messages in this example are from the bridging switch 114 via the STP 106. The TCL 214 actually receives the ISUP layer message from the ISUP Server 204.

The state transition diagram for nominal incoming call processing 400 is described as follows with reference to FIGS. 4A–C (with states shown parenthetically):

Event 1a.

The TCL 214 receives a SS7 IAM from the bridging switch 104 to indicate a call is being offered to the NGSN 108 by the bridging switch 104, which includes the dialed number and an application identifier, which is used to identify the NGSN 108 application that needs to be applied to the call.

Response:

The TCL 214 sends a Call_Offered message to the NGSN 108 application engine. The Call_Offered message includes the application identifier, dialed number, and perhaps the ANI of the call. This instructs the NGSN 108 application engine to identify the application needed, and to allocate any internal resources needed to handle the call. For incoming calls, the bridging switch 104 identifies the circuit. TCL 214 gets the IP application port resource corresponding to this circuit before sending the Call_Offered message.

The TCL 214 also sends a SS7 ACM message to the bridging switch 104. This indicates that the signaling gateway 110 has received and is processing the IAM.

The TCL 214 places the call in state: "Wait for Call_Offered Return_Result."

Event 1b:

The TCL 214 receives an IAM from the bridging switch 104, in which the IAM specifies a continuity test is required on a circuit. Inbound continuity testing is illustrated in FIG. 4C.

Response:

The TCL 214 sends a Loop_Port message to the NGSN 108 which includes the intelligent peripheral port to which the continuity test is to be applied. The circuit is placed in state "TransCOTLoopRR" while the continuity test is performed.

Event 1c:

The TCL 214 receives LoopPort Return_Result.

Response:

The TCL 214 places the call in state "TransCOT."

Event 1d:

The TCL 214 receives a COT message indicating continuity check success.

Response:

The TCL 214 sends an UnLoopPort message to the NGSN 108, and places the call in state "TransUnLoopRRtoNewCall."

Event 1e:

The TCL 214 receives an UnLoopPort Return Result message.

Response:

The TCL 214 sends an ACM message to the bridging switch 104, and places the call in state "Incoming Busy."

Event 2:

The TCL 214 receives a Return_Result message from the application engine located on the NGSN 108 indicating that the NGSN 108 application engine has received the Call_Offered message, and has resources to handle the call. It also includes data that indicates which NGSN 108 customer application will be executed on the call and any special features that will be used to service the call. These data are to be used for billing records created by the bridging switch 104, and will be passed on to the bridging switch 104 in a SS7 FAR message.

Response:

The TCL 214 creates an SS7 ANM message and sends it to the bridging switch 104 to indicate that the NGSN 108 is now ready to accept the call. Upon receipt of the ANM, the bridging switch 104 will proceed to make a voice circuit connection to an the NGSN 108 intelligent peripheral port.

The TCL 214 also sends a SS7 FAR message to the bridging switch 104 to requests the bridging switch 104 to begin a billing record for the call. It contains data provided by the NGSN 108 in the Return_Result message.

The TCL 214 sets an indication to wait for the start billing FAA message.

Event 3:

The TCL 214 receives a SS7 Billing FAA message from the bridging switch 104 to indicate the bridging switch 104 has started a billing record and has made the voice connection to an the NGSN 108 intelligent peripheral port.

Response:

The TCL 214 sends a Connected message to the NGSN 108 application engine telling the NGSN 108 application engine that the voice connection to the bridging switch 104 has been made and to start execution of the customer application. The Connected message contains identifiers for the NGSN 108 intelligent peripheral and the circuit that the call is being received on. The NGSN 108 uses these identifiers to identify the intelligent peripheral network (logical) port in which to play the customer application.

There is a time delay between the TCL 214 sending the ANM to the bridging switch 104, and the bridging switch 104 actually making the voice connection to the NGSN 108 intelligent peripheral. This delay is unpredictable, and the NGSN 108 application engine customer application cannot know when the voice connection to the bridging switch 104 has been made and therefore when to start. Therefore, the TCL 214 provides a time buffer and trigger for starting the NGSN 108 customer application, in the form of sending the NGSN 108 a Connected message after the TCL 214 receives the FAA message from the bridging switch 104.

The TCL 214 places the call in state: "Wait for Release." This state represents the NGSN 108 processing a call.

Events 4a–b:

When the NGSN 108 incoming call processing 400 is complete, the TCL 214 may receive a Release message from the application engine located on the NGSN 108. This message indicates that incoming call processing 400 is complete and the voice circuit for the current call may be released. In event 4a, the Release message indicates that an RLT release is not needed. In event 4b, the Release message on the inbound circuit indicates that an RLT release is needed. For an RLT release, the bridging switch 104 will need to connect the inbound leg of the incoming call with an outbound call that was placed by the NGSN 108.

Response:

In event 4a, the TCL 214 sends a SS7 Release FAR message to the bridging switch 104 to request the bridging switch 104 to release the circuit to the NGSN 108 and complete its billing record for the call.

The TCL 214 places the call in state: "Wait for Release FAA." In event 4b, the TCL 214 sends a SS7 RLT FAR message to the bridging switch 104 for the inbound circuit. This message requests the bridging switch 104 to release the circuit to the NGSN 108 used for the incoming call, and connect (at the bridging switch 104) the inbound leg of the call to an outgoing call that was placed by the NGSN 108.

The TCL 214 places the call in state: "Wait for RLT FAA and REL." TCL 214 sets an indication to wait for the RLT FAA release message.

Event 5:

In event 5a, the TCL 214 receives a SS7 REL message from the bridging switch 104 which indicates that the circuit to the NGSN 108 has been released, and the call is completed. In event 5b, the TCL 214 receives a SS7 RLT FAA and two REL messages from the bridging switch 104 which indicates that the bridging switch 104 has released both the circuits for the incoming call to the NGSN 108 and the outgoing call placed by the NGSN 108, and has made a connection between the inbound and outbound call legs.

Response:

As a response to event 5b, the TCL 214 sends a Return_Result message to the application Engine located on the NGSN 108. This message indicates that the call has been completed. The Return_Result message provides confirmation that the call has completed.

As a response to both event 5a and event 5b, the TCL 214 places the circuit(s) is state "Idle."

Examples of Unexpected Results

Event 6:

While waiting for a Call_Offered Return_Result message from the NGSN 108, the TCL 214 receives a Call_Offered error or reject message from the NGSN 108. This indicates an error in the NGSN 108 incoming call processing 400, or that the NGSN 108 was unable to allocate available resources to the call.

Response:

The TCL 214 sends a SS7 REL message to the bridging switch 104 which instructs the bridging switch 104 to release the voice circuit to the NGSN 108 for the call.

The TCL 214 places the call in state: "TransRLC."

Event 7a:

While waiting for a Billing FAA message from the bridging switch 104, The TCL 214 receives a Release message from the NGSN 108. This may indicate that no incoming call processing 400 is needed, or that it cannot process the call.

Response:

The TCL 214 sends a Release_Notice message to the NGSN 108 instructing it that the circuit for the call is being released by the bridging switch 104. The TCL 214 places the call in state "TransRelNoticeRRtoREL."

Upon receiving the RelNoticeRR, the TCL 214 sends a SS7 REL message to the bridging switch 104 which instructs the bridging switch 104 to release the voice circuit. The TCL 214 places the call in state "TransRLC."

Event 7b:

While waiting for a Billing FAA message from the bridging switch 104, the TCL 214 receives a SS7 FRJ message from the bridging switch 104 to indicate that the bridging switch 104 cannot allocate resources needed to complete the call.

Response:

The TCL 214 sends a SS7 REL message to the bridging switch 104 which instructs the bridging switch 104 to release the voice circuit to the NGSN 108 for the call. The TCL 214 places the call in state "TransRLC."

The TCL 214 sends a Release_Notice message to the NGSN 108 instructing it that the circuit for the call is being released by the bridging switch 104.

The TCL 214 places the call in state: "Wait for RLC."

Event 8:

While waiting for a Release FAA or RLT FAA & REL message from the bridging switch 104, the TCL 214 receives a SS7 FRJ message from the bridging switch 104 which indicates that the bridging switch 104 encountered an abnormal condition while trying to complete the call.

Response:

The TCL 214 sends a REL message to the bridging switch 104 which instructs the bridging switch 104 to release the voice circuit to the NGSN 108 for the call.

The TCL 214 sends a Release_Notice message to the NGSN 108 notifying it that the circuit for the call is being released by the bridging switch 104.

The TCL 214 places the call in state: "Wait for RLC."

Event 9:

While in state TransRLC, the TCL 214 receives a SS7 RLC message from the bridging switch 104 to indicate that the bridging switch 104 has released the voice circuit to the NGSN 108.

Response:

The TCL 214 places the circuit in state: "Idle."

Event 10:

At any time after The TCL 214 has sent a Call_Offered message to the NGSN 108, the network may release the circuit. In such a case, The TCL 214 receives an REL message from bridging switch 104.

Response:

The TCL 214 sends a Release_Notice message to the NGSN 108.

The TCL 214 places the call in state: "TransRelNoticeRRtoRLC."

Event 11:

The TCL 214 receives a Release_Notice Return_Result message from the NGSN 108.

Response:

The TCL 214 sends an RLC message to the bridging switch 104.

The TCL 214 places the circuit in state: "Idle."

Event 12:

After sending a Release_Notice message to the NGSN 108 and waiting for a Release_Notice Return_Result, the TCL 214 receives a Release_Notice Reject from the NGSN 108.

Response:

The TCL 214 sends a Reset Circuit message to the bridging switch 104 and generates an alarm.

Event 13:

While the NGSN 108 and the bridging switch 104 perform a continuity test, the TCL 214 receives a REL message from the bridging switch 104. This indicates that the voice circuit to the NGSN 108 is being released by the bridging switch 104.

Response:

The TCL 214 sends an UnLoop_Port message to the NGSN 108, which instructs it to remove the loopback on the port. The TCL 214 places the call in state "TransUnLoopRRtoRLC."

Event 14:

The TCL 214 receives UnLoopPort Return_Result from the NGSN 108.

Response:
   The TCL 214 sends an RLC message and places the call in state "Idle."

2. Outgoing Call States Processing

Figure 5:
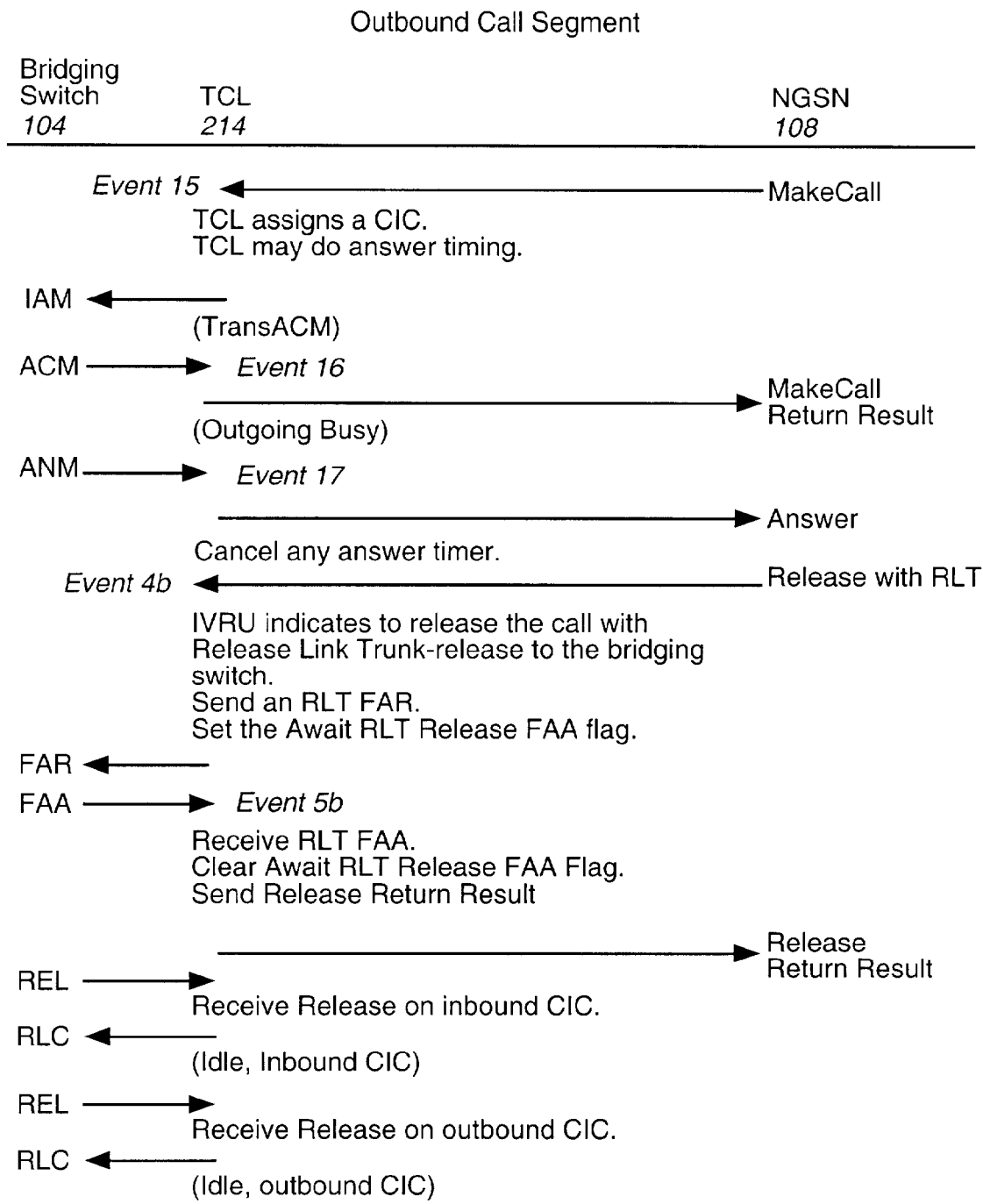
FIG. 5 is a call flow illustrating outgoing call states processing performed by the transaction control layer according to the present invention.

FIG. 5 is a call flow illustrating the outgoing call states processing 500 performed by the TCL 214 in a preferred embodiment. FIG. 5 illustrates the states that a current call may have within the TCL 214, when a circuit is involved in an outgoing call. It also shows the messages that trigger state transitions, and the responses performed by the TCL 214. General processing is described below.

For outgoing calls (calls placed by the NGSN 108 to the bridging switch 104), the NGSN 108 may request either an intelligent peripheral or an intelligent peripheral port, from which to place the call. Via its resource management capabilities, the TCL 214 selects an available circuit and corresponding bridging switch 104 port and NGSN 108 intelligent peripheral port. The TCL 214 then sends a request for a particular bridging switch 104 port to the bridging switch 104. If the NGSN 108 requests only an intelligent peripheral, The TCL 214 will select the least used port from the available ports. This feature makes the signaling gateway 110 compatible with various IVR service platforms—those that may select their own port for placing outbound calls, and those that cannot.

The state transition diagram (FIG. 5) for nominal outgoing call states processing 500 is described as follows:

Event 15:
   The TCL 214 receives a Make_Call message from the NGSN 108 which indicates that the NGSN 108 needs to place an outgoing call to the bridging switch 104.
Response:
   The TCL 214 sends an IAM to the bridging switch 104. The IAM includes the dialed number of the call, which is included with the Make_Call message received from the NGSN 108.
   The TCL 214 places the call in state: "TransACM."
Event 16:
   The TCL 214 receives a SS7 ACM message from the bridging switch 104 to indicate that the bridging switch 104 has received and is processing the IAM.
Response:
   The TCL 214 sends a Make_Call Return_Result message to the NGSN 108, which includes an identifier for the circuit that is to be used.
   The TCL 214 places the call in state: "Wait for Answer Message (ANM)."
Event 17:
   The TCL 214 receives an Answer Message from the bridging switch 104, indicating that the call has been answered.
Response:
   The TCL 214 sends an Answer message to the NGSN 108. The TCL 214 places the call in state: "Wait for Release." The call is now in progress.
Event 18:
   The TCL 214 may receive only an ANM from the bridging switch 104.
Response:
   The TCL 214 sends both the Return_Result and the Answer messages to the NGSN 108.
   The TCL 214 places the call in state: "Wait for Release."
Event 19:
   The TCL 214 receives a Release message from the NGSN 108. This indicates that the NGSN 108 is finished processing the call, and the voice circuit may be released.

Response:
   The TCL 214 sends a SS7 Release FAR message to the bridging switch 104.
   The TCL 214 places the call in state: "Wait for Facility Accepted (FAA) & Release (REL)."
Event 20:
   The TCL 214 receives an FAA & REL message from the bridging switch 104, indicating the voice circuit to the NGSN 108 has been released.
Response:
   The TCL 214 sends a Return_Result message to the NGSN 108 and a RLC message to the bridging switch 104, indicating the call is completed.
   The TCL 214 places the circuit in state: "Idle."

Events 15–20, above, represent nominal outgoing call processing 500 for an outgoing call. Several exception processes may occur. Some examples follow.

Event 21:
   While waiting for an ACM in response to an IAM sent to the bridging switch 104, the TCL 214 receives an IAM from the bridging switch 104 for another call, specifically one that the bridging switch 104 is offering to the NGSN 108 on the same circuit that the TCL 214 requested in the IAM in event 1.
Response:
   The TCL 214 yields the circuit for the incoming call, and begins incoming call state processing 400 for the call on that circuit. If the bridging switch 104 is not controlling glare, the IAM from the bridging switch 104 will be ignored.
Event 22:
   While waiting for an ACM in response to an IAM sent to the bridging switch 104, the TCL 214 receives a SS7 REL or RSC message from the bridging switch 104, indicating that an error occurred at the bridging switch 104 while trying to setup the outgoing call.
Response:
   The TCL 214 sends a RLC message to the bridging switch 104 to indicate the circuit is being placed in "Idle" state.
   If the Release cause is "'resource unavailable," the TCL 214 sends a Make_Call Error message to the application engine located on the NGSN 108 indicating to the NGSN 108 that the outgoing call could not be made. If the Release cause is not "resource unavailable," the TCL 214 will again attempt to send the IAM message once, and returns to state "TransACM."
Event 23:
   While waiting for an ANM message from the bridging switch 104, the TCL 214 receives a REL message from the bridging switch 104. This is usually an indication that the caller has hung up or the circuit connection between the bridging switch 104 an the NGSN 108 intelligent peripheral has broken.
Response:
   The TCL 214 sends a Release_Notice message to the application engine located on the NGSN 108, and places the call in state "TransRelNoticeRR."

3. Local Maintenance Circuit Blocking States Processing

A block may be applied to a circuit by the NGSN 108 for maintenance activities. A block is also applied to all circuits by the signaling gateway 110 at startup. After a block at startup, the signaling gateway 110 then waits for logons to be applied by the NGSN 108. This is how the signaling gateway 110 determines which circuits are available for use when the signaling gateway 110 is first brought on-line. The logons result in the TCL 214 sending unblock messages for all circuits which were "logged on." A call flow of the startup sequence is explained below with reference to FIG. 6.

Blocks and unblocks may be applied to a single circuit or to a circuit group. Different messages are used for each. Events 1, 2, 3, and 4 represent the process of a circuit's blocking states at startup of the signaling gateway 110.

Event 1:
When the signaling gateway 110 initializes, the first event is to block all circuits associated with the NGSN 108 node (send BLOs or CGBs). The TCL 214 places each circuit in call management state "Await Block Ack," and the call processing state is "Idle, Locally Blocked."

Event 2:
The TCL 214 receives a SS7 BLA message from the bridging switch 104 for an individual circuit, or a SS7 CGBA message for a circuit group.

Response:
The TCL sends a CQM message(s) to confirm the far end blocking states.

Event 3:
The TCL receives a CQR message(s), and takes appropriate action to attempt to match up any unexpected far end states (process defined by ANSI T1.113).

Response:
The TCL 214 may now receive PSP connections.

Event 4:
The TCL 214 receives a Logon message from the NGSN 108, indicating which circuits are up and to be made available for calls.

The Logon message is received after startup (event 2) or after a Logoff message has been received (event 11). A Reset_Circuit message is received by a maintenance user to reset a circuit blocking state. A logon message may also be received anytime after a logoff message.

Response:
The TCL 214 unblocks the circuit(s) with UBL/CGU message(s). The TCL 214 places the circuit in call management state "Await Unblock Ack."

Event 5:
The TCL 214 receives a UBS/CGUA message(s) from the bridging switch 104.

Response:
The TCL 214 places the circuit in blocking state: "Idle." The circuit is now available for receiving incoming calls and placing outgoing calls.

Events 6, 7, 8, and 9 represent the process of a circuit's blocking states during a complete cycle of a maintenance activity for blocking and unblocking a circuit or circuit group.

Event 6:
The TCL 214 receives a circuit or circuit group block from the maintenance user 212. This is typically encountered when the NGSN 108 needs to perform maintenance activity on the circuit or circuit group.

Response:
The TCL 214 sends a BLO or CGB message as needed to the bridging switch 104. TCL also sends a Deactivate-Port message to the NGSN 108. The TCL 214 places the call in call management state "Await Block Ack." The TCL 214 adds the blocking state "Local Block" to the current call processing state. For example, a circuit in state "Incoming Busy" will become "Incoming Busy, locally blocked."

Event 7:
The TCL 214 receives a SS7 BLA or CGBA message from the bridging switch 104, indicating that the circuit or circuit group has been blocked. The TCL214 also receives a DeactivatePort Return_Result message from the NGSN 108.

Event 8:
The TCL 214 receives a circuit or circuit group unblock message from the maintenance user 212.

Response:
The TCL 214 sends a UBL or CGU message to the bridging switch 104, and places the circuit in call management state "Await Unblock Ack."

Event 9:
While in state "Await Unblock Ack," the TCL 214 receives a SS7 UBA or a CGUA message from the bridging switch 104, indicating that the circuit or circuit group is now unblocked.

Response:
The TCL 214 removes the blocking indication from the current call state. For example, a circuit in state "Incoming Busy, Locally Blocked" will become "Incoming Busy." The TCL 214 also sends an ActivatePort message to the NGSN 108, and will receive an ActivatePort Return_Result message in response.

Event 10:
The TCL 214 receives a Logoff message from the NGSN 108 for a circuit or circuit group. This indicates that the NGSN 108 is making the circuit or circuit group unavailable for use. An example logoff is explained below with reference to FIG. 7.

Response:
The TCL 214 sends a BLO/CGB message, and places the circuit in call management state "Await Block Ack," and call processing state, plus "Local Block." The TCL 214 also sends a Logoff Return_Result, as well as a DeactivatePort message to the NGSN 108.

Event 11:
The TCL 214 receives a request from the Maintenance User 212 to reset a circuit (or circuits), or, invalid state processing within TCL 214 requires a reset circuit.

Response:
The TCL 214 sends a reset circuit (RSC) to the bridging switch 104, and places the circuit in state "TransRLC," with no local or remote blocking.
The TCL 214 will also send an ActivatePort message to the NGSN 108.

Event 12:
The TCL 214 receives the RLC response from the bridging switch 104. The TCL 214 returns to "Idle" state.

4. Remote Maintenance Circuit Blocking States Processing

Figure 7:
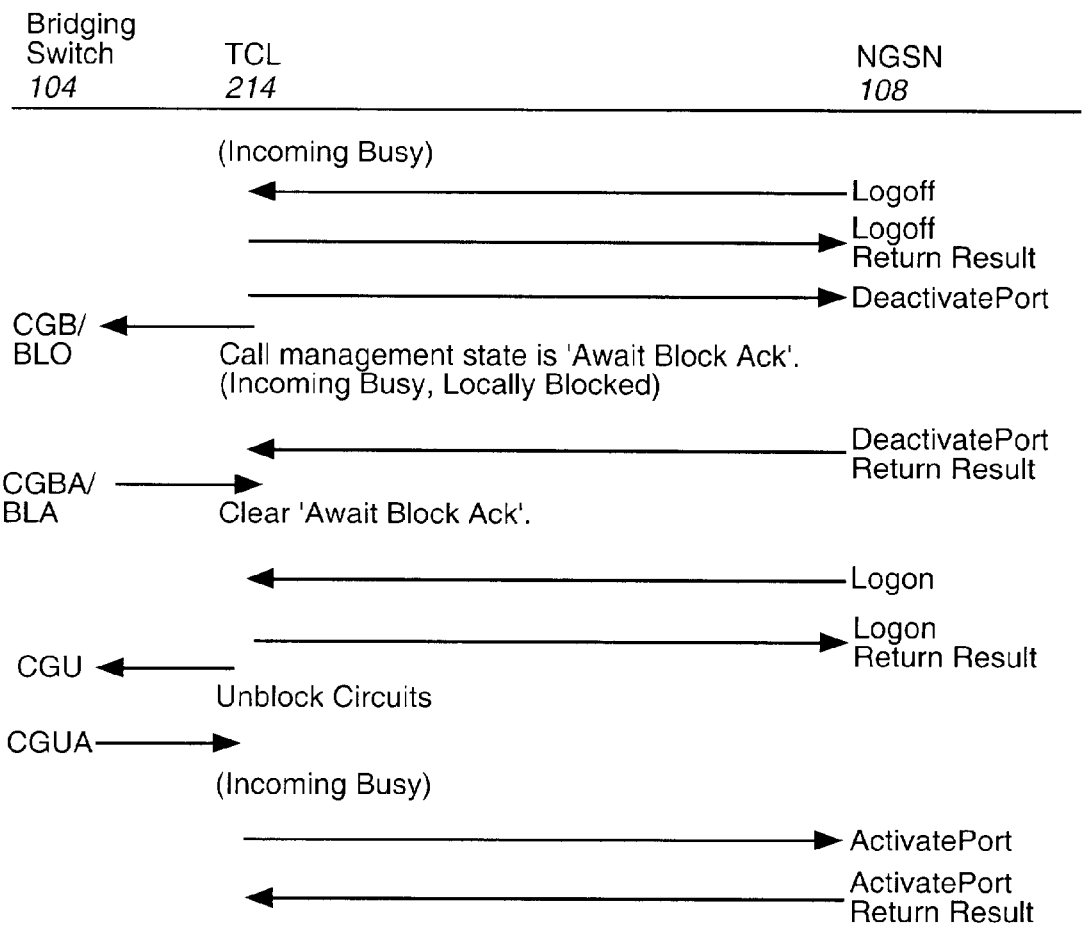
FIG. 7 is a process flow illustrating a logoff/logon procedure from a next generation service node while a circuit is involved in a call.

FIG. 7 is process flow illustrating a logoff/logon procedure from a NGSN 108 node while a circuit is involved in a call. The logoff procedure shown in FIG. 7 is an exemplary one—a "soft logoff" in which the circuit is blocked, but not immediately released. Logoffs, however, may be received in any state. A "hard logoff," where the circuit is blocked and immediately released, is also possible.

A block, unblock, or reset circuit may be applied to a circuit by the bridging switch 104 for maintenance activities. The TCL 214 handles standard ANSI T1.113 processing for remote blocking, as well as below internal specifics with regard to messaging to the NGSN 108. TCL 214 will also provide state-dependent processing for each received maintenance message in every defined TCL state.

Event 1:
   At system startup, all circuits are placed in remote maintenance blocking state "Wait for Reset Acknowledge." This ensures a circuit is not made available for use until acknowledgment from the bridging switch 104 is received.

Event 2:
   The TCL 214 receives a SS7 RLC or GRA message from the bridging switch 104. This indicates that the circuit or circuit group is available for use on the bridging switch 104.

Response:
   The TCL 214 places the circuit in blocking state: "No Remote Block."

Event 3:
   The TCL 214 receives a SS7 BLO or COB message from the bridging switch 104. This is typically encountered when the bridging switch 104 needs to perform maintenance activity on the circuit or circuit group.

Response:
   The TCL 214 places the circuit in blocking state: "Remote Block." The TCL 214 will also send a DeactivatePort message to the NGSN 108.

Event 4:
   The TCL 214 receives a SS7 UBL, CGU, Reset_Circuit, or GRS message from the bridging switch 104.

Response:
   The TCL 214 places the circuit in blocking state: "No Remote Block." The TCL 214 responds with UBA, CGUA, RLC or GRA, respectively to the bridging switch 104.
   The TCL 214 may also send an ActivatePort message to the NGSN 108, if not locally blocked.

Event 5:
   At any time, a maintenance user may issue a Reset_Circuit command, or the NGSN 108 may send a Logoff command.

Response:
   The TCL 214 places the circuit in blocking state: "Wait for Reset Acknowledge."

Example Environment

Figure 8:
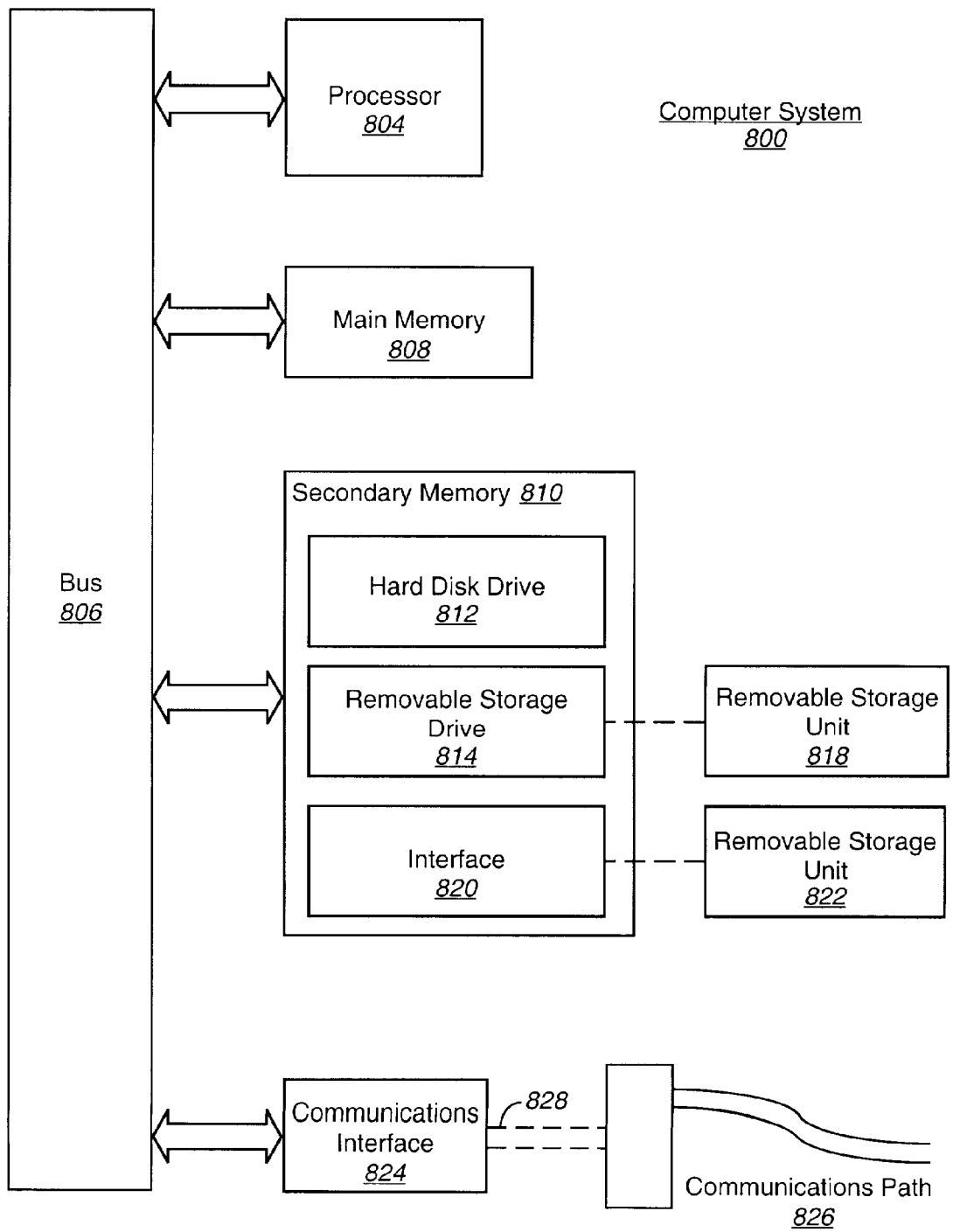
FIG. 8 is a block diagram of an exemplary computer system useful for implementing the present invention.

The present invention (i.e., transaction control layer 214 or any part thereof) may be implemented using hardware, software or a combination thereof and may be implemented in a computer system or other processing system. In fact, in one embodiment, the invention is directed toward a computer system capable of carrying out the functionality described herein. An example of a computer system 800 is shown in FIG. 8. The computer system 800 includes one or more processors, such as processor 804. The processor 804 is connected to a communication bus 806. Various software embodiments are described in terms of this example computer system. After reading this description, it will become apparent to a person skilled in the relevant art how to implement the invention using other computer systems and/or computer architectures.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCMCIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path (i.e., channel) 826. This channel 826 carries signals 828 and may be implemented using wire or cable, fiber optics, a phone line, a cellular phone link, an RF link and other communications channels.

In this document, the terms "computer program medium" and "computer usable medium" are used to generally refer to media such as removable storage drive 814, a hard disk installed in hard disk drive 812, and signals 828. These computer program products are means for providing software to computer system 800.

Computer programs (also called computer control logic) are stored in main memory 808 and/or secondary memory 810. Computer programs may also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. Thus the present invention should not be limited by any of the above-described exemplary embodiments, but should be defined only in accordance with the following claims and their equivalents.

What is claimed is:

1. A transaction control layer system for a signaling gateway that encapsulates multiple signaling systems into a single signaling interface for use by a next generation service node (NGSN) deployed in a telecommunications network, comprising:
    means for receiving incoming messages;
    first performing means for performing initial processing of said incoming messages;
    first sending means for sending response messages based on said initial processing;
    second performing means for performing state-dependent processing of said incoming messages for calls and resources to produce result messages, said second performing means comprises:
        means for retrieving state data of said calls and of said resources on the NGSN,
        means for translating between a first resource identifier, specified by a switch on the telecommunications network in said incoming messages, to a second resource identifier, specified by the NGSN,
        means for allocating resources on the NGSN, specified by said second identifier, to said calls, and
        means for storing said state data of said calls and said resources on the NGSN; and
    second sending means for sending said result messages based on said state-dependent processing,
    wherein said NGSN is configured to provide interactive services for said calls.

2. The system of claim 1, wherein said means for receiving comprises:
    means for receiving incoming messages from at least one of:
        (i) an application engine located on the NGSN wherein said incoming messages are in a proprietary signaling protocol (PSP) used by the NGSN;
        (ii) a switch located on the telecommunications network wherein said messages are in a standard signaling protocol used by the telecommunications network; and
        (iii) a maintenance user via a graphical user interface.

3. The system of claim 2, wherein said first performing means comprises:
    means for checking the validity of said incoming messages;
    means for logging statistics about said incoming messages; and
    means for generating alarms for invalid ones of said incoming messages.

4. The system of claim 2, wherein said first sending means comprises:
    a further first sending means for sending response messages to the NGSN in said PSP; and
    a further second sending means for sending response messages to said switch located on the telecommunications network in said standard signaling protocol.

5. The system of claim 1, wherein said second sending means comprises:

means for sending said result messages to at least one of:
        (i) an application engine located on the NGSN wherein said result messages are in a PSP; and
        (ii) a switch located on the telecommunications network wherein said result messages are in a standard signaling protocol used by the telecommunications network.

6. A computer program product comprising a computer usable medium having computer readable program code means embodied in said medium for causing an application program to execute on a computer that provides a transaction control layer system for a signaling gateway that encapsulates multiple signaling systems into a single signaling interface for use by a next generation service node (NGSN) deployed in a telecommunications network, said computer readable program code means comprising:
    a first computer readable program code means for causing the computer to receive incoming messages;
    a second computer readable program code means for causing the computer to perform initial processing of said incoming messages;
    a third computer readable program code means for causing the computer to send response messages based on said initial processing;
    a fourth computer readable program code means for causing the computer to perform state-dependent processing of said incoming messages for calls and resources to produce result messages, said fourth computer readable program code means comprises:
        a sixth computer readable program code means for causing the computer to retrieve state data of said calls and of said resources on the NGSN,
        a seventh computer readable program code means for causing the computer to translate between a first resource identifier, specified by a switch on the telecommunications network in said incoming messages, to a second resource identifier, specified by the NGSN,
        an eighth computer readable program code means for causing the computer to allocate resources on the NGSN, specified by said second identifier, to said calls, and
        a ninth computer readable program code means for causing the computer to store said state data of said calls and said resources on the NGSN; and
    a fifth computer readable program code means for causing the computer to send said result messages based on said state dependent processing,
    wherein said NGSN is configured to provide interactive services for said calls.

7. The computer program product of claim 6, wherein said second computer readable program code means comprises:
    a tenth computer readable program code means for causing the computer to check the validity of said incoming messages;
    an eleventh computer readable program code means for causing the computer to log statistics about said incoming messages; and
    a twelfth computer readable program code means for causing the computer to generate alarms for invalid ones of said incoming messages.

8. The computer program product of claim 6, wherein said third computer readable program code means comprises:
    a tenth computer readable program code means for causing the computer to send response messages to the NGSN in a proprietary signaling protocol; and an eleventh computer readable program code means for causing the computer to send response messages to said switch located on the telecommunications network in a standard signaling protocol.

9. A method for a signaling gateway transaction control layer that encapsulates multiple signaling systems into a single signaling interface for use by a next generation service node (NGSN) deployed in a telecommunications network, comprising the steps of:

(1) receiving incoming messages;

(2) performing initial processing of said incoming messages;

(3) sending response messages based on said initial processing;

(4) performing state-dependent processing of said incoming messages for calls and resources to produce result messages, including retrieving state data of said calls and of said resources on the NGSN, translating between a first resource identifier, specified by a switch on the telecommunications network in said incoming messages, to a second resource identifier, specified by the NGSN, allocating resources on the NGSN, specified by said second identifier, to said calls, and storing said state data of said calls and said resources on the NGSN; and (5) sending said result messages based on said state-dependent processing, wherein said NGSN is configured to provide interactive services for said calls.

10. The method of claim 9, wherein step (2) comprises the steps of:

(a) checking the validity of said incoming messages;

(b) logging statistics about said incoming messages; and (c) generating alarms for invalid ones of said incoming messages.

11. The method of claim 9, wherein step (3) comprises the steps of:

(a) sending response messages to the NGSN in a proprietary signaling protocol; and (b) sending response messages to said switch located on the telecommunications network in a standard signaling protocol.

12. The method of claim 11, wherein steps (1)–(5) are performed for at least one of:

(i) processing incoming call states based on said incoming messages originating from said switch to the NGSN;

(ii) processing outgoing call states based on said incoming messages originating from the NGSN to said switch;

(iii) processing circuit blocking for local maintenance by the NGSN;

(iv) processing circuit blocking for remote maintenance by said switch; and (v) processing circuit use states.

13. The system of claim 1, wherein said NGSN is configured to provide interactive voice response services for said calls.

14. The computer program product of claim 6, wherein said NGSN is configured to provide interactive voice response services for said calls.

15. The method of claim 9, wherein said NGSN is configured to provide interactive voice response services for said calls.

16. A system, comprising:

a switch network;

a service node configured to provide interactive services for incoming calls from the switch network; and a signaling gateway coupled between the switch network and the service node, the signaling gateway including a transaction control layer that provides message translation between a plurality of signaling interfaces that may be used by the switch network and a single signaling interface that is used by the service node, the transaction control layer including:

a state machine process that tracks states of both calls and circuits between the switch network and the service node and that processes incoming calls to, and outgoing calls from, the service node, and a call and circuit state data store configured to store current states of the calls and circuits and configured to operate in conjunction with the single state machine.

17. The system of claim 16, wherein the service node is configured to, in the course of providing interactive voice response services to an incoming call, transfer the incoming call to one of a plurality of call centers that are coupled to the switch network.

* * * * *